(12) United States Patent
Uno et al.

(10) Patent No.: US 9,316,806 B2
(45) Date of Patent: Apr. 19, 2016

(54) LENS BARREL AND CAM MECHANISM

(71) Applicant: Panasonic Corporation, Osaka (JP)

(72) Inventors: Tetsuya Uno, Osaka (JP); Takumi Kuwahara, Nara (JP)

(73) Assignee: Panasonic Intellectual Property Managemtn Co., Ltd., Osaka (JP)

( * ) Notice: Subject to any disclaimer, the term of this patent is extended or adjusted under 35 U.S.C. 154(b) by 302 days.

(21) Appl. No.: 13/905,130

(22) Filed: May 30, 2013

(65) Prior Publication Data

US 2013/0258507 A1    Oct. 3, 2013

Related U.S. Application Data

(63) Continuation of application No. PCT/JP2011/006756, filed on Dec. 2, 2011.

(30) Foreign Application Priority Data

Dec. 3, 2010  (JP) .................................. 2010-269864
Jan. 24, 2011  (JP) .................................. 2011-011670

(51) Int. Cl.
    *G02B 7/10*     (2006.01)
    *G02B 7/02*     (2006.01)
    *G02B 7/04*     (2006.01)
    *F16H 25/12*    (2006.01)

(52) U.S. Cl.
    CPC .............. *G02B 7/022* (2013.01); *F16H 25/122* (2013.01); *G02B 7/023* (2013.01); *G02B 7/04* (2013.01); *Y10T 74/2101* (2015.01)

(58) Field of Classification Search
    USPC .......................... 359/699, 700, 811, 813, 817
    See application file for complete search history.

(56) References Cited

U.S. PATENT DOCUMENTS

| 4,472,032 A | 9/1984 | Kamata et al. |
| 2004/0042091 A1 | 3/2004 | Nomura |
| 2009/0185298 A1 | 7/2009 | Shirakata |

FOREIGN PATENT DOCUMENTS

| CN | 101487921 | 7/2009 |
| JP | 57-116309 | 7/1982 |
| JP | 9-171203 | 6/1997 |
| JP | 10-123403 | 5/1998 |
| JP | 2002-090611 | 3/2002 |
| JP | 2002-333566 | 11/2002 |
| JP | 2004-258637 | 9/2004 |
| JP | 2006-301362 | 11/2006 |
| JP | 2007-219304 | 8/2007 |
| JP | 2009-211102 | 9/2009 |

OTHER PUBLICATIONS

International Search Report of PCT Application No. PCT/JP2011/006756 dated Jan. 24, 2012.
English Translation of Chinese Search Report dated Nov. 19, 2014 for the related Chinese Patent Application No. 201180058185.6.

*Primary Examiner* — Alicia M Harrington
(74) *Attorney, Agent, or Firm* — Panasonic Patent Center

(57) ABSTRACT

A lens barrel includes an optical system for forming an optical image of an object, a first tube for supporting at least one lens included in the optical system, and a second tube disposed inside or outside the first tube. The first tube includes first cam grooves in the side surface thereof on which the second tube is disposed. The second tube includes first cam followers that engage with the first cam grooves.

9 Claims, 20 Drawing Sheets

LENS BARREL AND CAM MECHANISM

TECHNICAL FIELD

Technologies disclosed herein relate to lens barrels which hold optical systems and to cam mechanisms, and more particularly to a structure used for extending a barrel.

BACKGROUND ART

A lens barrel is known which holds an optical system capable of changing its focal length. The lens barrel of this type moves a first lens group in the optical axis direction with respect to a first moving cam ring, by means of the first moving cam ring and a first group lens barrel. In the first moving cam ring, cam grooves are formed. The first group lens barrel has follower pins engaging with the cam grooves, and holds the first lens group (see Japanese Patent Unexamined Publication No. 2007-219304 and Japanese Patent Unexamined Publication No. 2002-90611, for example).

SUMMARY OF THE INVENTION

A lens barrel disclosed herein includes an optical system which forms an optical image of an object, a first tube which supports at least one lens included in the optical system, and a second tube which is disposed inside or outside the first tube. The first tube has first cam grooves in a side surface thereof on which the second tube is disposed. The second tube has first cam followers which engage with the first cam grooves.

DESCRIPTION OF EMBODIMENTS (First Exemplary Embodiment)

A first embodiment will be described hereinafter with reference to the accompanying figures. Note that, for convenience in illustration, in digital camera 1, the object side thereof is defined as the front side or the front face side, the photographer side thereof is defined as the rear side or the back side, the vertical upper side thereof in a landscape attitude of digital camera 1 is defined as the upper side, the vertical lower side thereof in a landscape attitude of digital camera 1 is defined as the lower side, the right side thereof as viewed from an object is defined as the right side, and the left side thereof as viewed from the object is defined as the left side. The landscape attitude is an attitude in which the long side direction of CCD 110 is in parallel with the horizontal direction and the short side direction of CCD 110 is in parallel with the vertical direction.

<Configuration of Digital Camera>

Figure 1:
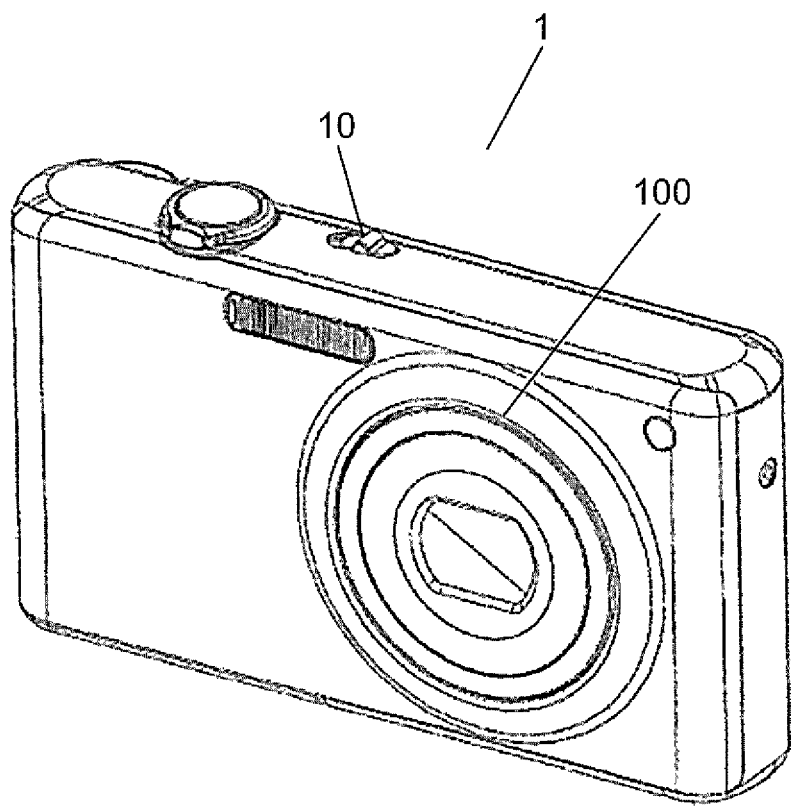
FIG. 1 is a perspective view of a digital camera equipped with a lens barrel according to a first embodiment.

As shown in FIG. 1, digital camera 1 includes lens barrel 100. Upon turning on power by using power switch 10, lens barrel 100 is extended and digital camera 1 becomes ready to photograph.

Note that, although FIG. 1 shows digital camera 1, it is only an example of image pickup apparatus. It may be a film camera other than digital cameras, and may be a camera capable of removing and interchanging lens barrel 100. Moreover, it may be a camcorder capable of shooting moving images, other than still cameras.

<Total Configuration of Lens Barrel>

Figure 2:
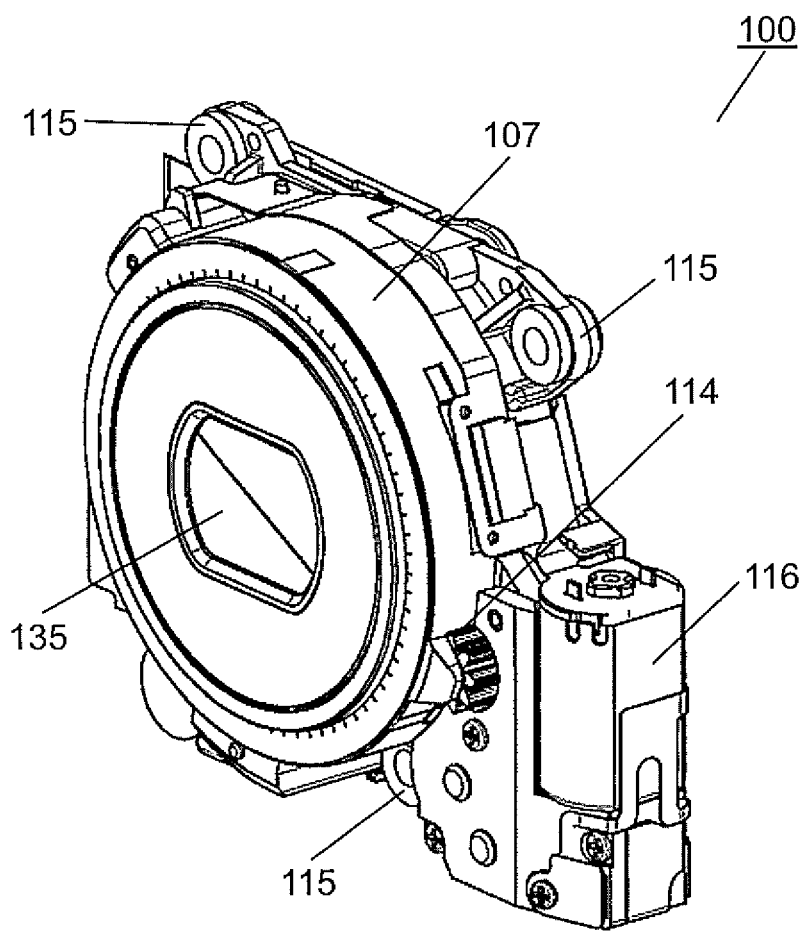
FIG. 2 is a perspective view of the lens barrel being collapsed, according to the first embodiment.
Figure 3:
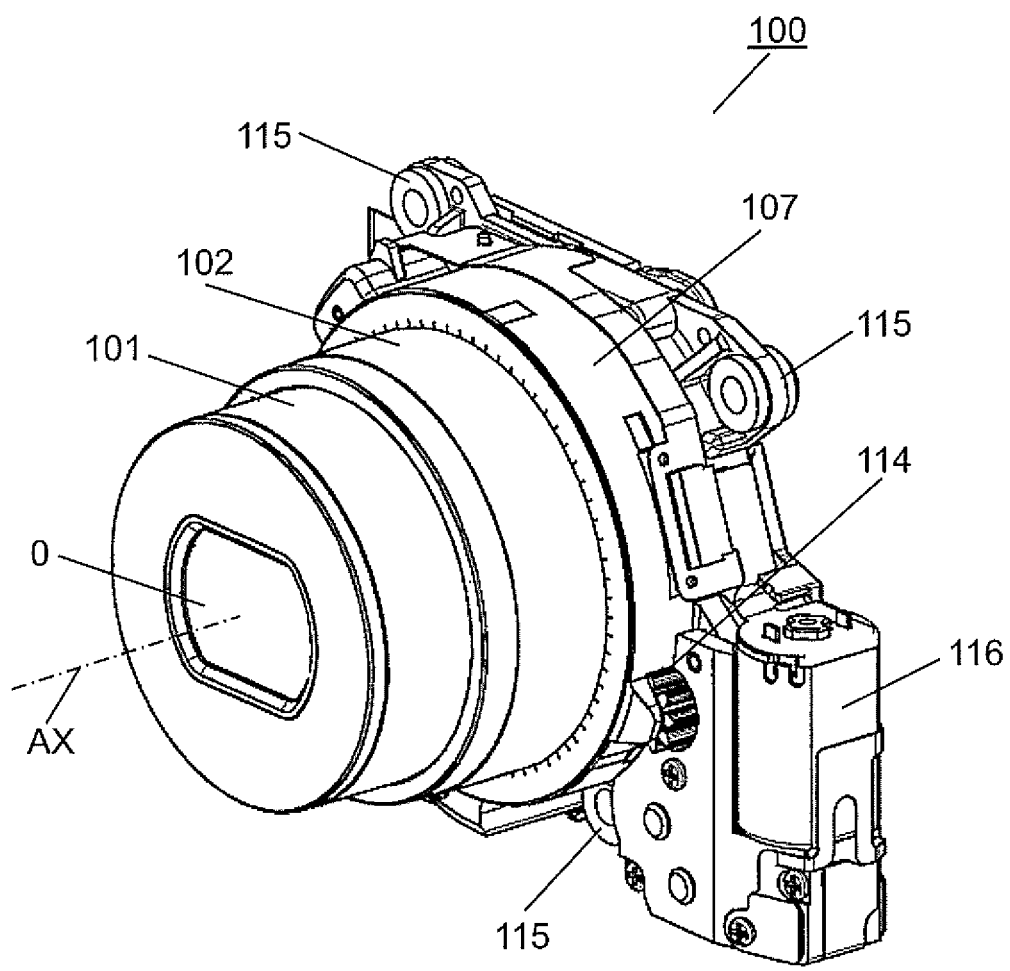
FIG. 3 is a perspective view of the lens barrel in photographing, according to the first embodiment.
Figure 4:
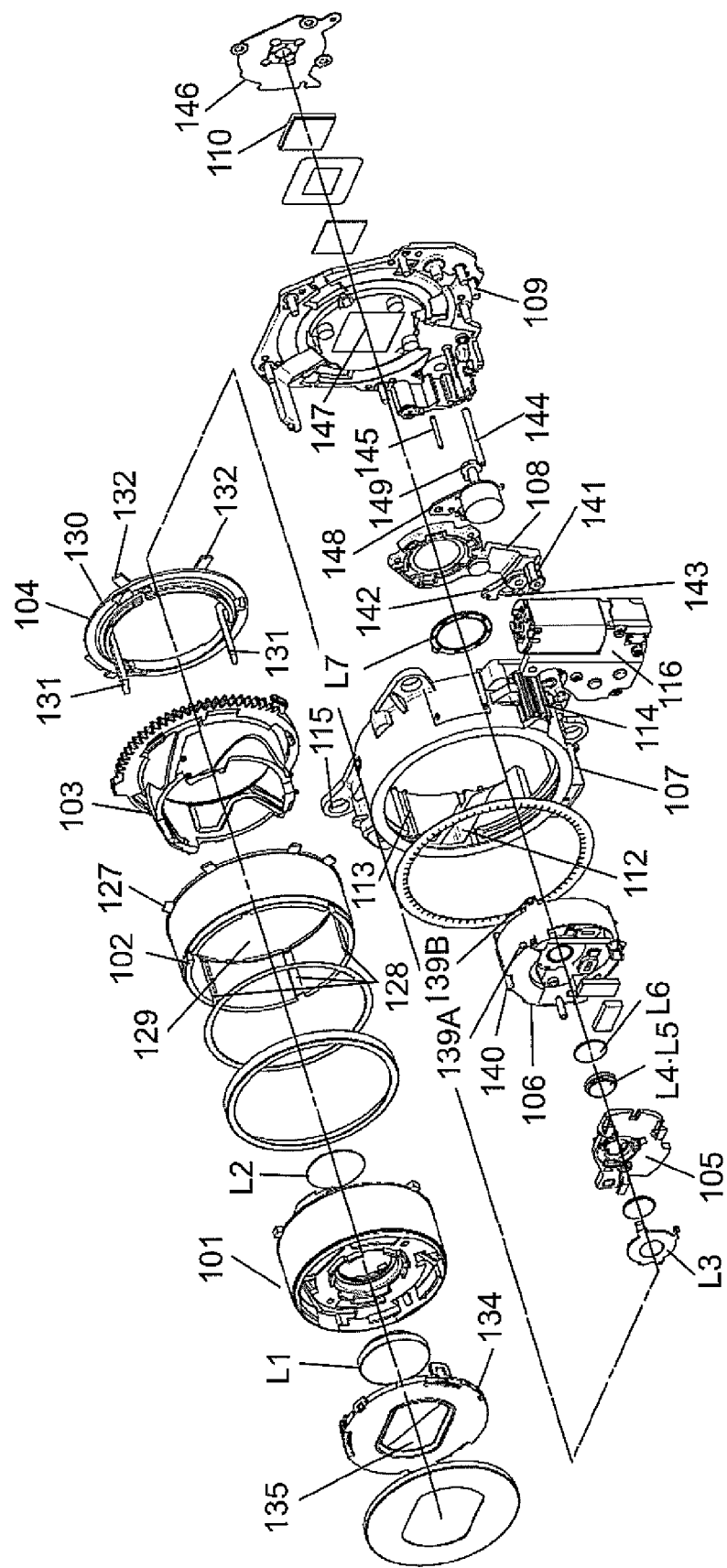
FIG. 4 is an exploded perspective view of the lens barrel according to the first embodiment.
Figure 5A:
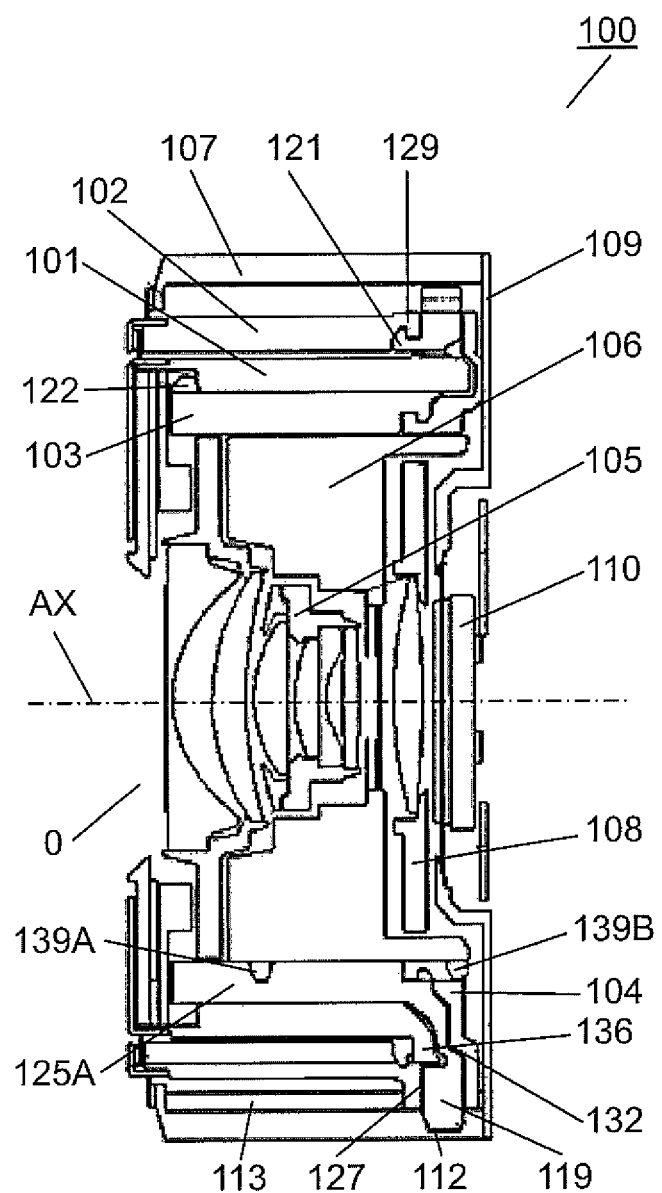
FIG. 5A is a structural view of the lens barrel being collapsed, according to the first embodiment.
Figure 5B:
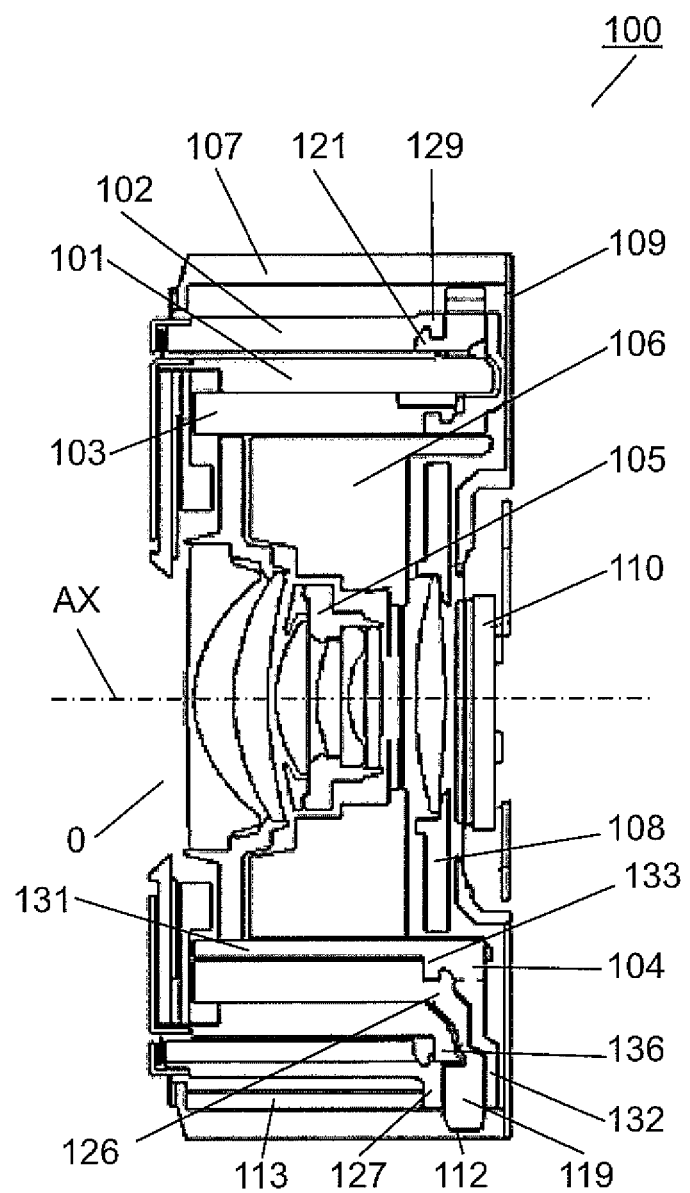
FIG. 5B is another structural view of the lens barrel being collapsed, according to the first embodiment.
Figure 6A:
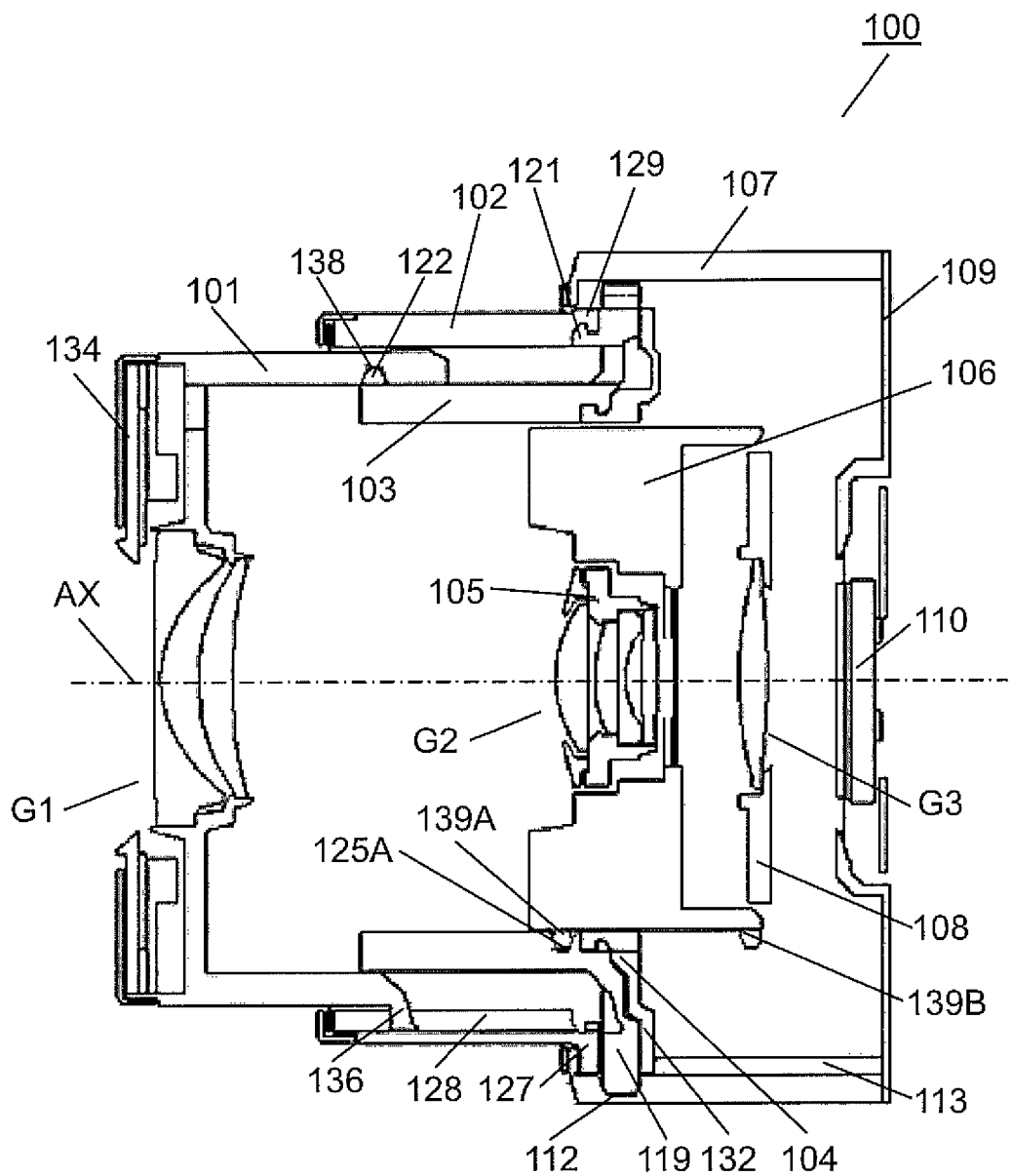
FIG. 6A is a structural view of the lens barrel at the wide angle end, according to the first embodiment.
Figure 6B:
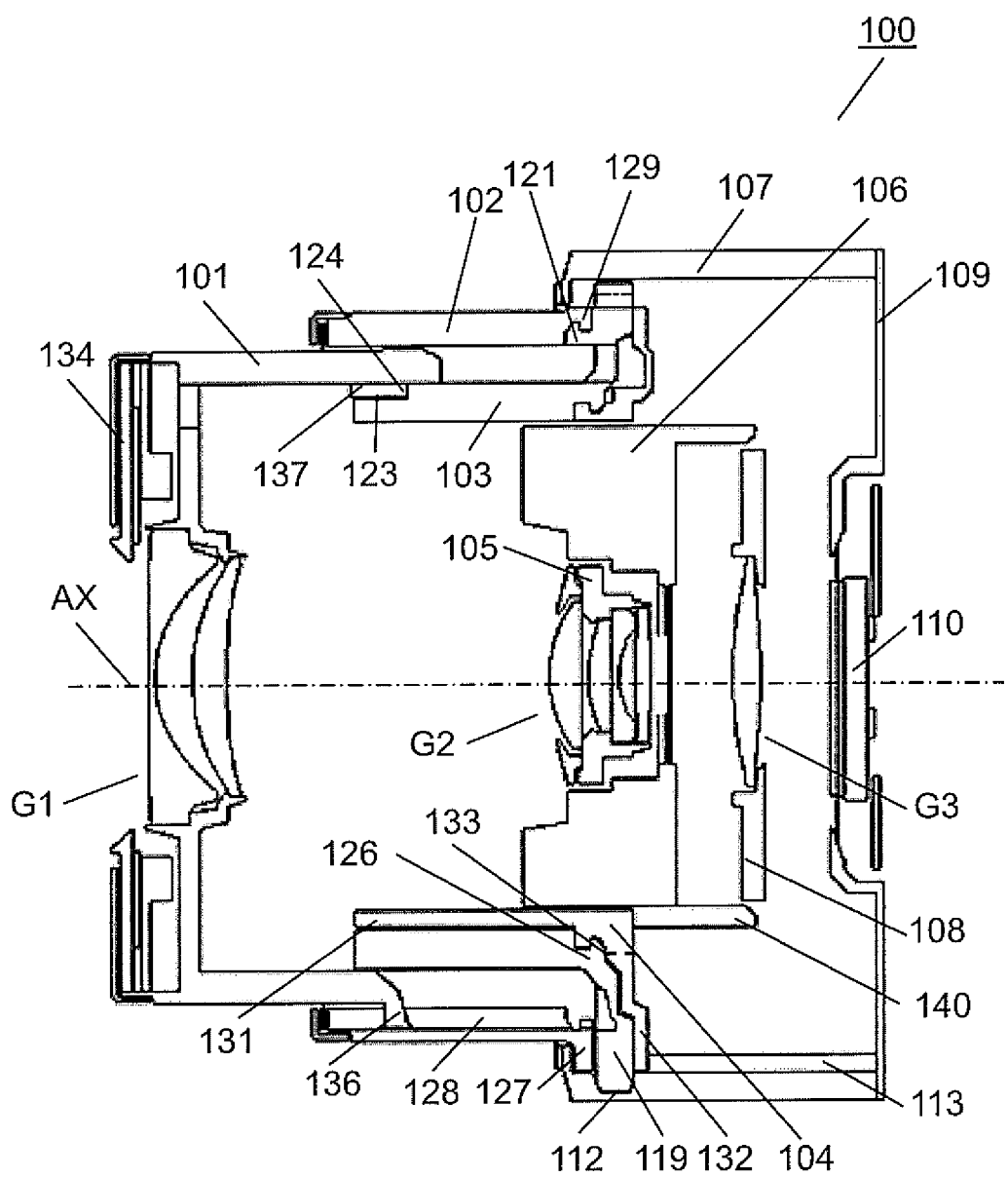
FIG. 6B is another structural view of the lens barrel at the wide angle end, according to the first embodiment.
Figure 7A:
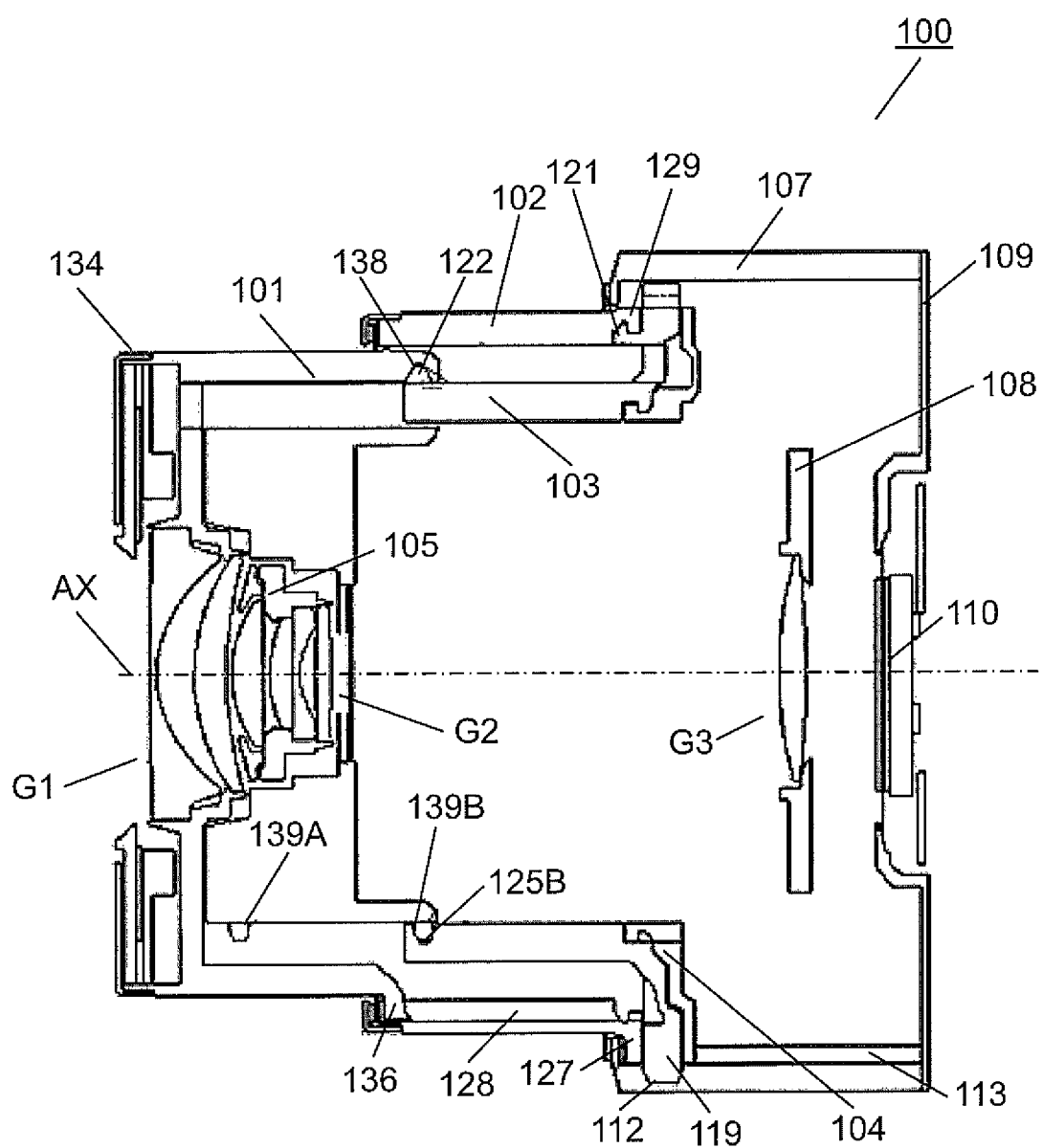
FIG. 7A is a structural view of the lens barrel at the telephoto end, according to the first embodiment.
Figure 7B:
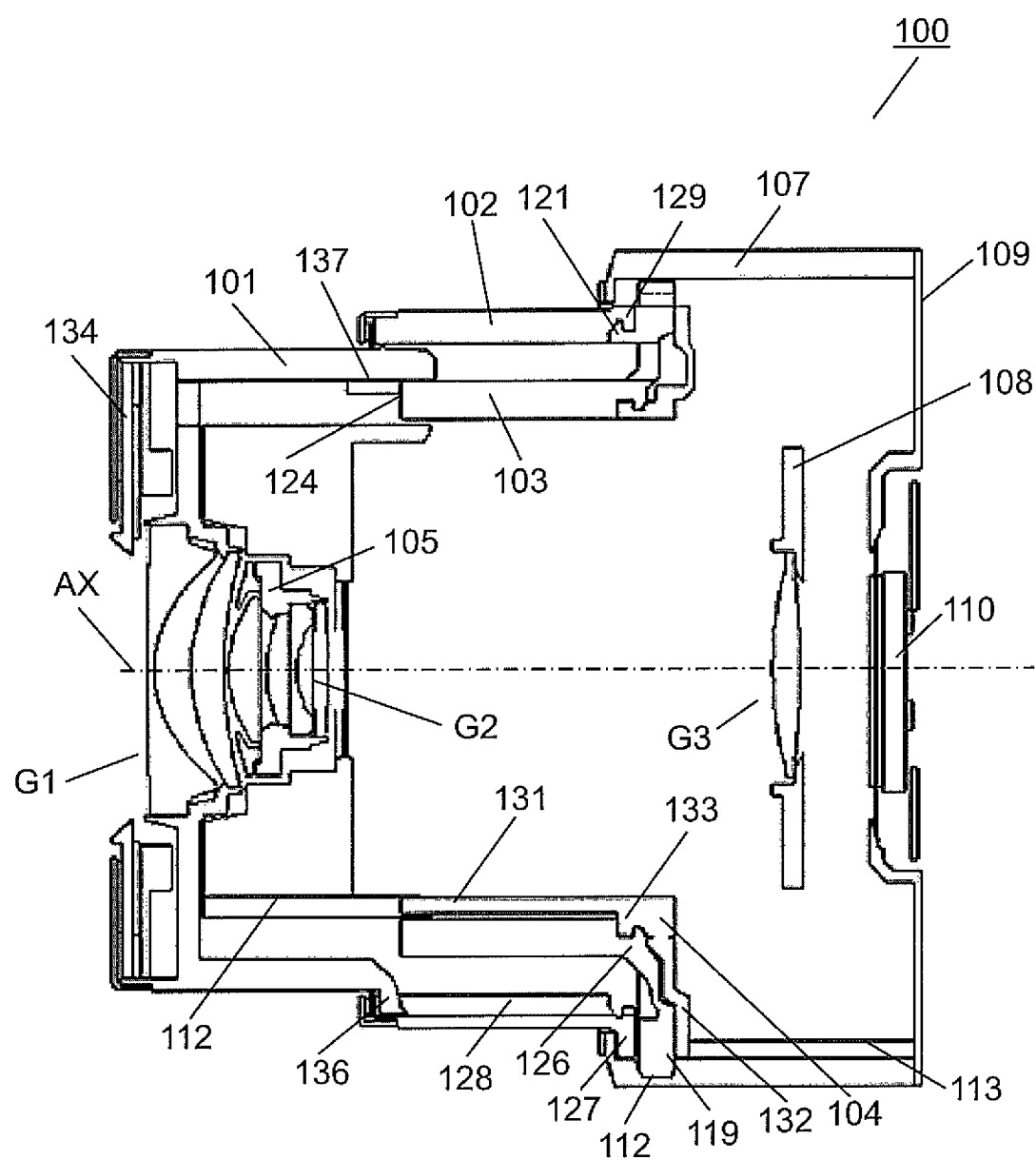
FIG. 7B is another structural view of the lens barrel at the telephoto end, according to the first embodiment.

Lens barrel 100 is in a state of being collapsed, as shown in FIG. 2, when the power of digital camera 1 is turned OFF. In the state of being collapsed, a plurality of frames of lens barrel 100 is withdrawn such that the barrel becomes smaller in size in the optical axis AX direction. Lens barrel 100 is in a state ready to photograph, as shown in FIG. 3, when the power of digital camera 1 is turned ON. In the state ready to photograph, a plurality of frames of lens barrel 100 is extended such that the barrel becomes larger in size in the optical axis AX direction.

As shown in FIGS. 4 to 7, lens barrel 100 includes optical system O and a lens driving mechanism. Moreover, CCD 110 is secured to lens barrel 100.

Optical system O forms the optical image of an object on the light receiving surface of CCD 110. Optical system O includes first lens group G1, second lens group G2, and third lens group G3. First lens group G1 is configured with first lens L1, and second lens L2. Second lens group G2 is configured with third lens L3, fourth lens L4, fifth lens L5, and sixth lens L6. Third lens group G3 is configured with seventh lens L7. Lens barrel 100 changes the focal length of optical system O in such a manner that: First lens group G1, second lens group G2, and third lens group G3 are respectively moved, in the optical axis AX direction, such that distances are changed both between first lens group G1 and second lens group G2 and between second lens group G2 and third lens group G3. The changing of the focal length is also called as zooming. Moreover, lens barrel 100 moves third lens group G3 in the optical axis AX direction to change a focusing state of optical system O. The changing of the focusing state is also called as focusing. Note, however, that the configuration (number and shape) of each lens of optical system O may be another one.

CCD 110 receives the optical image of an object, and converts it into an electrical image signal to output. CCD 110 is only an example of image pickup devices. The image pickup devices may be a CMOS image sensor.

First lens group G1, second lens group G2, and third lens group G3 are driven by lens driving mechanism 111. Hereinafter, details of the lens driving mechanism will be described.

<Lens Driving Mechanism>

The lens driving mechanism includes first group frame 101, first group rectilinear-advance frame 102, cam frame 103, second group rectilinear-advance frame 104, image stabilizing frame 105, shutter unit 106, fixing frame 107, third group frame 108, and master flange 109.

First group frame 101 holds first lens group G1. Image stabilizing frame 105 holds second lens group G2. Third group frame 108 holds third lens group G3. First group frame 101, image stabilizing frame 105, and third group frame 108 are driven in the optical axis direction with respect to fixing frame 107.

(Fixing Frame 107)

In the inner surface of fixing frame 107, there are formed three of first cam grooves 112, and six of first rectilinear-advance guide grooves 113. Fixing frame 107 supports cam frame 103 via first cam grooves 112. Moreover, fixing frame 107 supports first group rectilinear-advance frame 102 via first rectilinear-advance guide grooves 113.

To the outer periphery of fixing frame 107, first drive gear 114 is secured which has a rotary shaft in parallel with the optical axis. Moreover, at the outer periphery of fixing frame 107, mounting parts 115 for mounting to the body of digital camera 1 are formed. That is, fixing frame 107 is secured to the body of digital camera 1. Specifically, mounting parts 115 are secured with screws, for example.

To fixing frame 107, master flange 109 is secured. Specifically, bosses for screw-securing are formed on fixing frame 107; master flange 109 is secured to fixing frame 107 with screws and the bosses of fixing frame 107.

To fixing frame 107, zoom motor unit 116 is secured. Zoom motor unit 116 rotationally drives first drive gear 114.

(Cam Frame 103)

Figure 8:
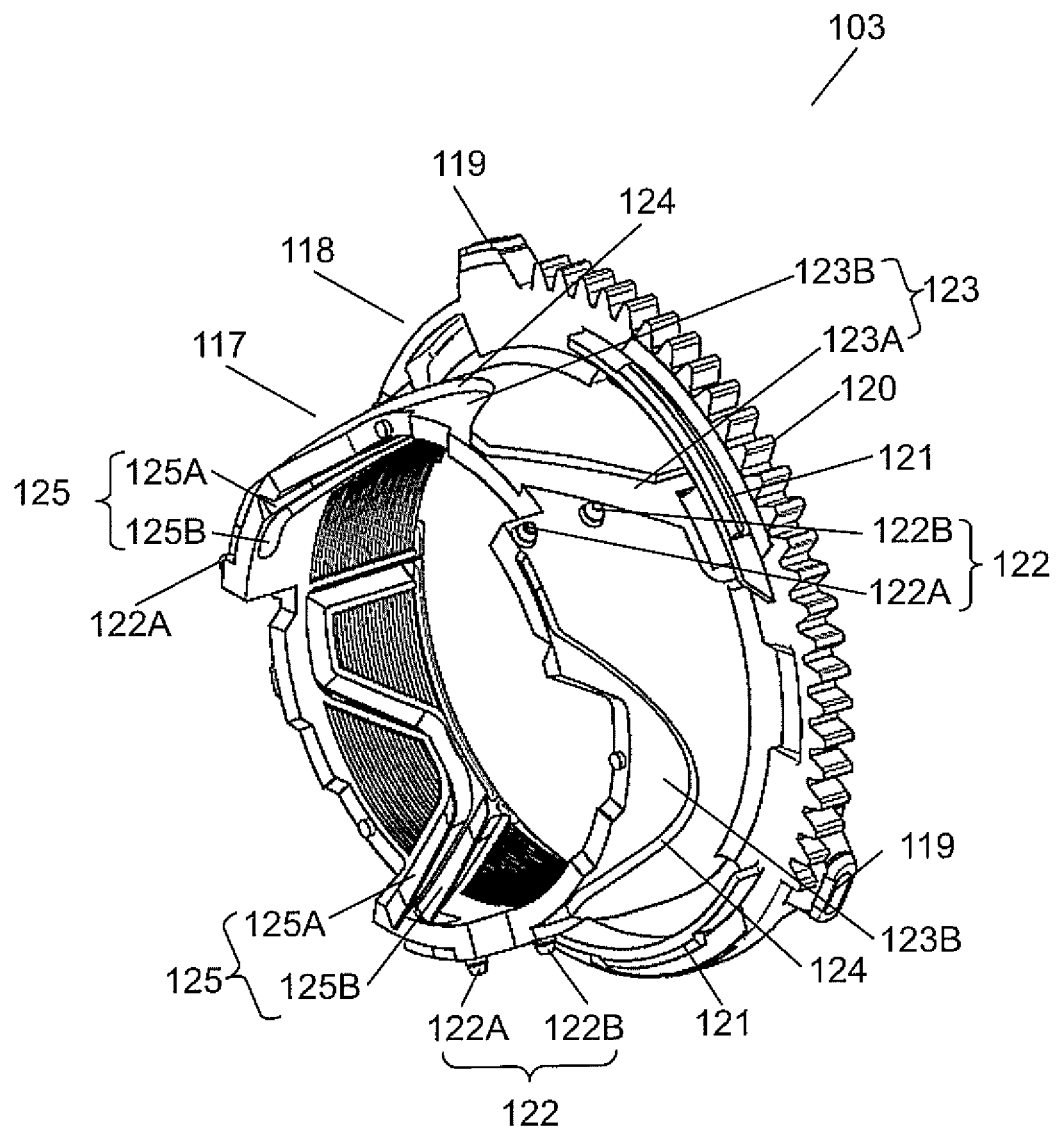
FIG. 8 is a perspective view of a cam frame according to the first embodiment.
Figure 9:
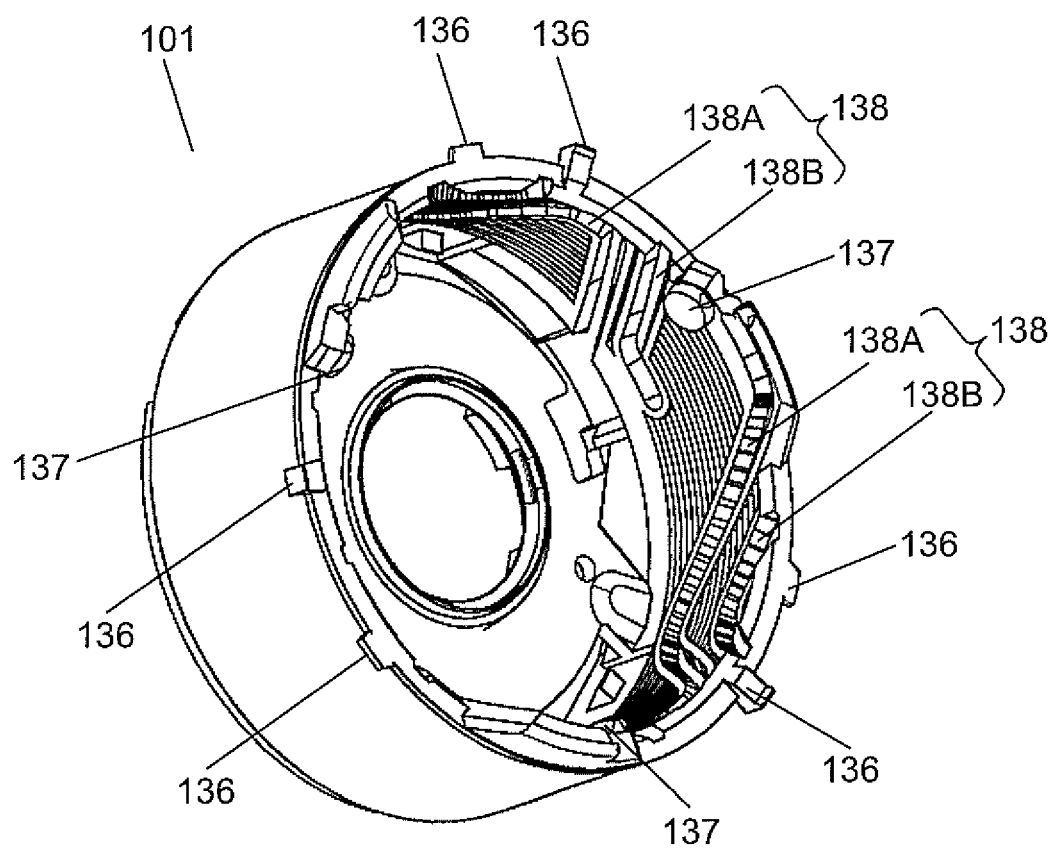
FIG. 9 is a perspective view of a first group frame according to the first embodiment.

As shown in FIG. 8, cam frame 103 includes tube part 117 having a tube shape, and first flange part 118 that is formed, from the end portion backward of tube part 117, toward the outer peripheral side.

At the outer periphery of first flange part 118, there are formed three of first cam pins 119, gear part 120, and first bayonet engaging part 121. As shown in FIGS. 4 to 7, each of first cam pins 119 engages with one of first cam grooves 112. Cam frame 103 is supported by fixing frame 107 via first cam pins 119. Gear part 120 engages with first drive gear 114 to be rotated by first drive gear 114. That is, cam frame 103 is rotationally driven by zoom motor unit 116 via gear part 120 and first drive gear 114.

On and in the outer face of tube part 117, six of second cam pins 122 and three of third cam grooves 123 are respectively formed. Second cam pins 122 are formed in three groups of two. The two pins of each group are aligned and disposed at a distance away from each other, in the optical axis AX direction. Third cam grooves 123 each have continuous wall surface 124 located in the rear side of the groove. In front of wall surface 124, the groove is opened in part of sections. Specifically, third cam grooves 123 each have first section 123A where another wall surface is present in front of wall surface 124, and second section 123B where the groove is opened in front of wall surface 124. Note that, as another embodiment, it is possible to consider the configuration in which all the sections of the groove are opened in front of wall surface 124.

In the inner surface of tube part 117, six of fourth cam grooves 125 and second bayonet engaging part 126 are formed.

(First Group Rectilinear-Advance Frame 102)

As shown in FIGS. 4 to 7, first group rectilinear-advance frame 102 has a tube form. On the outer surface of first group rectilinear-advance frame 102, six of first rectilinear-advance guide projections 127 are formed which protrude outward. First rectilinear-advance guide projections 127 engage with first rectilinear-advance guide grooves 113. First rectilinear-advance guide grooves 113 are grooves which extend in the optical axis AX direction to guide first rectilinear-advance guide projections 127. First group rectilinear-advance frame 102 is supported by fixing frame 107, by means of first rectilinear-advance guide projections 127 and first rectilinear-advance guide grooves 113. The first group rectilinear-advance frame is movable in the optical axis AX direction with respect to fixing frame 107, and is prohibited from rotating in the rotational direction about optical axis AX with respect to fixing frame 107.

In the inner surface of first group rectilinear-advance frame 102, six of second rectilinear-advance guide grooves 128 and third bayonet engaging part 129 are formed. Second rectilinear-advance guide grooves 128 are grooves which extend in the optical axis AX direction. Third bayonet engaging part 129 is a groove that extends in the circumference direction. Third bayonet engaging part 129 engages with first bayonet engaging part 121. The engagement between third bayonet engaging part 129 and first bayonet engaging part 121 prohibits first group rectilinear-advance frame 102 from moving in the optical axis AX direction with respect to cam frame 103, and allows cam frame 103 to be rotatable with respect to first group rectilinear-advance frame 102.

(Second Group Rectilinear-Advance Frame 104)

As shown in FIGS. 4 to 7, second group rectilinear-advance frame 104 has second flange part 130 and two of arm parts 131. Arm parts 131 extend forward from the inner peripheral side of second flange part 130, in parallel with optical axis AX.

On the outer periphery of second flange part 130, there are formed three of second rectilinear-advance guide projections 132 that protrude outward, and fourth bayonet engaging part 133 that has a form extending in the circumference direction. Each of second rectilinear-advance guide projections 132 engages with one of first rectilinear-advance guide grooves 113. The engagement between second rectilinear-advance guide projections 132 and first rectilinear-advance guide grooves 113 allows second group rectilinear-advance frame 104 to be supported by fixing frame 107. Also, the engagement causes the second group rectilinear-advance frame to be movable in the optical axis AX direction with respect to fixing frame 107, and prohibits the second group rectilinear-advance frame from rotating in the rotational direction about optical axis AX with respect to fixing frame 107. Moreover, fourth bayonet engaging part 133 engages with second bayonet engaging part 126. The engagement between fourth bayonet engaging part 133 and second bayonet engaging part 126 prohibits second group rectilinear-advance frame 104 from moving in the optical axis AX direction with respect to cam frame 103, and allows cam frame 103 to be rotatable with respect to second group rectilinear-advance frame 104.

(First Group Frame 101)

As shown in FIGS. 4 to 9, first group frame 101 supports first lens group G1. Moreover, first group frame 101 supports barrier unit 134 in front thereof. Barrier unit 134 has openable-and-closeable barrier part 135. When being collapsed, barrier part 135 is closed such that barrier part 135 protects first lens group G1 and cuts off light incident into optical system O. When photographing, barrier part 135 is opened to introduce light into optical system O.

On the outer periphery of first group frame 101, six of third rectilinear-advance guide projections 136 are formed which protrude outward. Each of third rectilinear-advance guide projections 136 engages with one of second rectilinear-advance guide grooves 128. The engagement between third rectilinear-advance guide projections 136 and second rectilinear-advance guide grooves 128 allows first group frame 101 to be supported by first group rectilinear-advance frame 102. Also, the engagement allows the first group frame to be movable in the optical axis AX direction with respect to first group rectilinear-advance frame 102, and prohibits the first group frame from rotating in the rotational direction about optical axis AX with respect to first group rectilinear-advance frame 102.

On and in the inner peripheral surface of first group frame 101, there are formed three of third cam pins 137 that protrude inward, and six of second cam grooves 138, respectively. Each of second cam grooves 138 engages with one of second cam pins 122. The engagement between second cam pins 122 and second cam grooves 138 allows first group frame 101 to be supported by cam frame 103. Moreover, first group frame 101 moves in the optical axis AX direction with respect to cam frame 103 through the movement of second cam pins 122 along second cam grooves 138.

Each of third cam pins 137 engages with one of third cam grooves 123. Specifically, third cam pins 137 are each inserted into one of third cam grooves 123. Wall surfaces 124 are formed along moving tracks of third cam pins 137 when second cam pins 122 move along second cam grooves 138. Wall surfaces 124 are formed backward of third cam pins 137, slightly away from third cam pins 137.

(Image Stabilizing Frame 105)

As shown in FIGS. 4 to 7, image stabilizing frame 105 supports second lens group G2. Image stabilizing frame 105 is supported by shutter unit 106. Image stabilizing frame 105 is movable in the plane perpendicular to optical axis AX with respect to shutter unit 106, and is prohibited from moving in the optical axis AX direction with respect to shutter unit 106. Second lens group G2 moves in the plane perpendicular to optical axis AX to change the position of the optical image on the light receiving surface. Image stabilizing frame 105 is driven by a driving means. For example, image stabilizing frame 105 is driven to suppress a blur of the optical image attributed to a shake of digital camera 1.

(Shutter Unit 106)

Shutter unit 106 accommodates an unshown shutter. Shutter unit 106 transmits light through it when the shutter is opened, while shutter unit 106 cuts off the light when the shutter is closed. Shutter unit 106 is capable of controlling the light-transmission and light-cut-off of optical system O.

On and in the outer peripheral surface of shutter unit 106, there are respectively formed six of fourth cam pins 139 (139A, 139B) and two of third rectilinear-advance guide grooves 140.

Fourth cam pins 139 engage with fourth cam grooves 125 (125A, 125B). The engagement between fourth cam pins 139 and fourth cam grooves 125 allows shutter unit 106 to be supported by cam frame 103. Moreover, the movement of fourth cam pins 139 along fourth cam grooves 125 causes shutter unit 106 to move in the optical axis AX direction with respect to cam frame 103.

Arm parts 131 engage with third rectilinear-advance guide grooves 140. The engagement between third rectilinear-advance guide grooves 140 and arm parts 131 allows shutter unit 106 to be movable in the optical axis AX direction with respect to second group rectilinear-advance frame 104, and prohibits shutter unit 106 from rotating in the rotational direction about optical axis AX with respect to second group rectilinear-advance frame 104.

(Third Group Frame 108)

As shown in FIGS. 4 to 7, third group frame 108 supports third lens group G3. Third group frame 108 includes rectilinear-advance guide part 141, anti-rotation part 142, and nut engagement part 143. Into rectilinear-advance guide part 141, first guide pole 144 is inserted. First guide pole 144 extends in the direction in parallel with optical axis AX. The engagement between rectilinear-advance guide part 141 and first guide pole 144 allows rectilinear-advance guide part 141 to be movable in the optical axis AX direction and prohibits the guide part from moving in the direction perpendicular to first guide pole 144. With anti-rotation part 142, second guide pole 145 engages. Second guide pole 145 extends in the direction in parallel with optical axis AX. The engagement between anti-rotation part 142 and second guide pole 145 prohibits third group frame 108 from rotating about first guide pole 144. With nut engagement part 143, nut 149 of focus motor unit 148 engages. Focus motor unit 148 includes a motor and a lead screw driven by the motor. The lead screw extends in the optical axis AX direction. The nut engages with the lead screw and is driven in the optical axis AX direction through the rotation of the lead screw. That is, third group frame 108 is driven in the optical axis AX direction by focus motor unit 148.

(Master Flange 109)

To master flange 109, first guide pole 144 and second guide pole 145 are secured. That is, master flange 109 supports third group frame 108, via first guide pole 144 and second guide pole 145.

Moreover, to master flange 109, CCD 110 is secured via CCD mounting plate 146 from the rear. CCD 110 is such that the light receiving surface thereof faces forward through opening 147.

The motor of focus motor unit 148 is secured to master flange 109 via a motor mounting plate. Third group frame 108 is driven in the optical axis AX direction with respect to master flange 109, by focus motor unit 148.

<Operations of Lens Barrel>

Next, operations of lens barrel 100 will be described. In addition, a more detailed configuration will be described.

Figure 10:
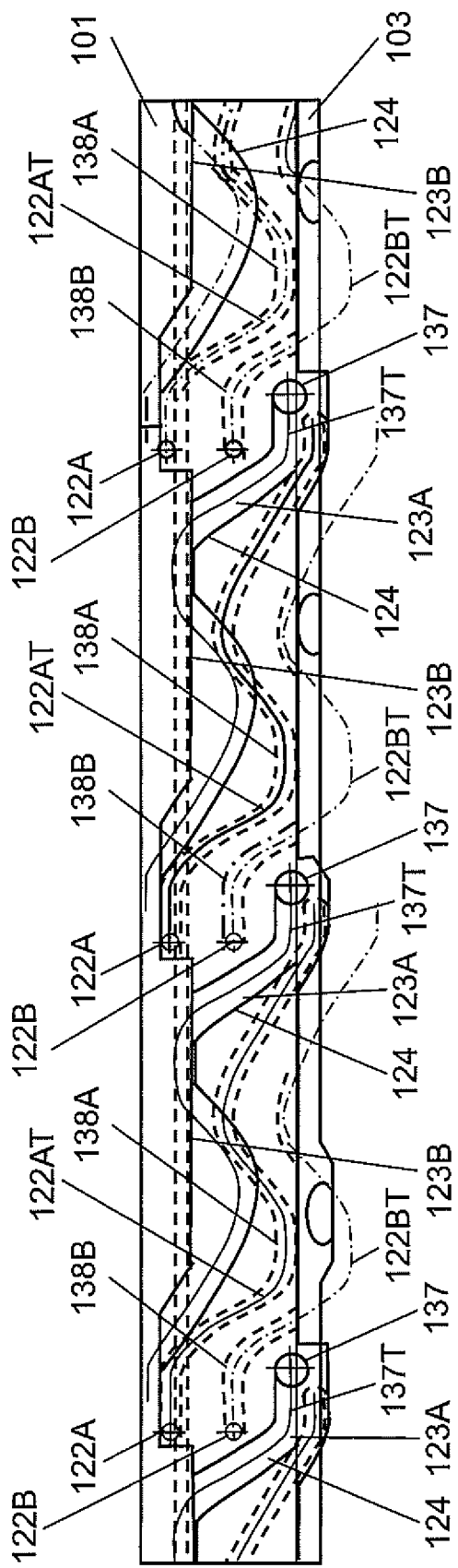
FIG. 10 is a developed view of second cam grooves and third cam grooves, when being collapsed, according to the first embodiment.
Figure 11:
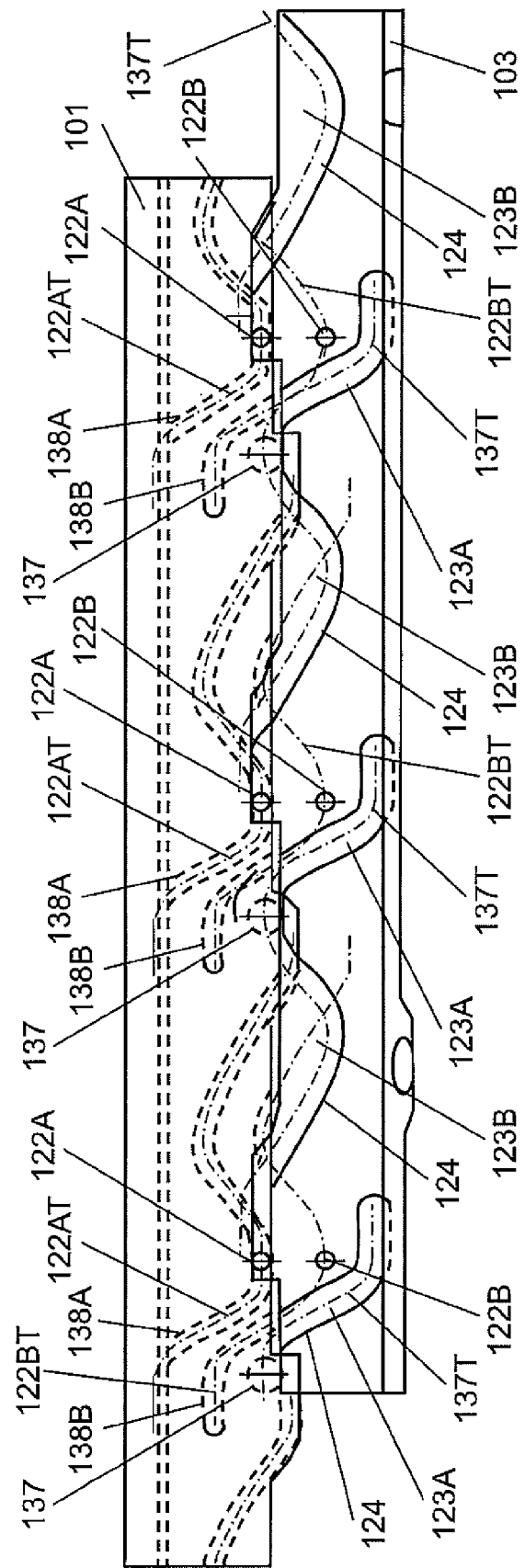
FIG. 11 is a developed view of the second cam grooves and the third cam grooves, at the wide angle end, according to the first embodiment.
Figure 12:
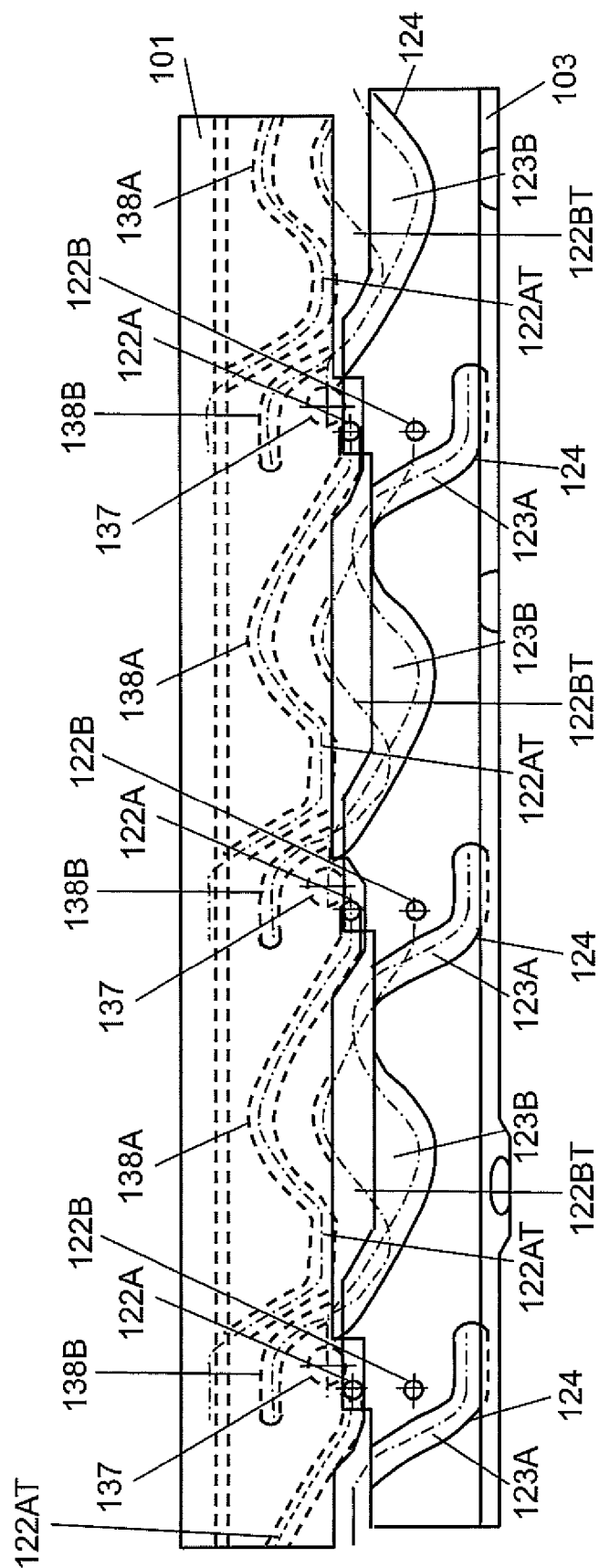
FIG. 12 is a developed view of the second cam grooves and the third cam grooves, at the telephoto end, according to the first embodiment.

Cam frame 103 rotates with respect to fixing frame 107, by means of zoom motor unit 116. First cam pins 119 of cam frame 103 move along first cam grooves 112 of fixing frame 107. Cam frame 103 moves in the optical axis AX direction with respect to fixing frame 107. That is, cam frame 103 is rotatable and movable in the optical axis AX direction. With this configuration, FIGS. 10 to 12 show moving tracks 137T of third cam pins 137, moving tracks 122AT of second front cam pins 122A, and moving tracks 122BT of second rear cam pins 122B.

Through the engagement between third bayonet engaging part 129 of first group rectilinear-advance frame 102 and first bayonet engaging part 121 of cam frame 103, first group rectilinear-advance frame 102 moves together with cam frame 103, as an integral whole, in the optical axis AX direction. With this configuration, because first rectilinear-advance guide projections 127 of first group rectilinear-advance frame 102 move along first rectilinear-advance guide grooves 113 of fixing frame 107, first group rectilinear-advance frame 102 does not rotate with respect to fixing frame 107. That is, first group rectilinear-advance frame 102 is unrotatable, and is movable in the optical axis AX direction.

Through the engagement between third rectilinear-advance guide projections 136 of first group frame 101 and second rectilinear-advance guide grooves 128 of first group rectilinear-advance frame 102, first group frame 101 does not rotate with respect to first group rectilinear-advance frame 102. That is, first group frame 101 is unrotatable. Then, when cam frame 103 rotates, second cam pins 122 of cam frame 103 move along second cam grooves 138 of first group frame 101, and first group frame 101 moves in the optical axis AX direction with respect to cam frame 103. In other words, first group frame 101 moves in the optical axis AX direction with respect to first group rectilinear-advance frame 102. That is, first group frame 101 is movable in the optical axis AX direction.

Through the engagement between fourth bayonet engaging part 133 of second group rectilinear-advance frame 104 and second bayonet engaging part 126 of cam frame 103, second group rectilinear-advance frame 104 moves together with cam frame 103, as an integral whole, in the optical axis AX direction. At that time, through the engagement between second rectilinear-advance guide projections 132 of second group rectilinear-advance frame 104 and first rectilinear-advance guide grooves 113 of fixing frame 107, second group rectilinear-advance frame 104 does not rotate.

Through the engagement between third rectilinear-advance guide grooves 140 of shutter unit 106 and arm parts 131 of second group rectilinear-advance frame 104, shutter unit 106 does not rotate. When cam frame 103 rotates, fourth cam pins 139 of shutter unit 106 move along fourth cam grooves 125 of cam frame 103, and shutter unit 106 moves in the optical axis AX direction with respect to cam frame 103. Image stabilizing frame 105 moves together with shutter unit 106, as an integral whole, in the optical axis AX direction.

Third group frame 108 moves in the optical axis AX direction with respect to master flange 109, by means of focus motor unit 148.

Accordingly, starting from the state of being collapsed, when the turning force of zoom motor unit 116 is transferred to gear part 120 of cam frame 103 via first drive gear 114, cam frame 103 rotates about optical axis AX or advances while rotating. Cam frame 103, first group rectilinear-advance frame 102, and second group rectilinear-advance frame 104 move, as an integral whole, in the optical axis AX direction with respect to fixing frame 107. At that time, first group rectilinear-advance frame 102 and second group rectilinear-advance frame 104 do not rotate. Then, first group frame 101 and shutter unit 106 move in the optical axis AX direction, by means of the turning force of cam frame 103. At that time, first group frame 101 and shutter unit 106 do not rotate.

<Features of Driving Mechanism of First Group Frame 101>

First group frame 101 is a frame to support the lenses. In order to guarantee the strength enough to support the lenses, the tube is required to have a certain thickness or more. In particular, first group frame 101 supports first lens group G1. First lens group G1 is particularly large in size because it is disposed at the closest position to the object in optical system O. Therefore, the frame supporting first lens group G1 is required particularly to have a large thickness. On the other hand, the formation of second cam grooves 138 in first group frame 101 will cause only a slight decrease in strength. The formation of second cam grooves 138 in first group frame 101 allows the driving mechanism of first group frame 101 with respect to cam frame 103, without upsizing first group frame 101 and with keeping the strength of first group frame 101. Note that, although second cam grooves 138 may be formed in the outer peripheral side of first group frame 101, second cam grooves 138 are preferably formed in the inner peripheral side in view of appearance. Moreover, as another embodiment, it is possible to consider the configuration in which cam grooves configuring a driving mechanism for driving a frame are formed in the frame that holds the lenses other than first lens group G1.

The movement of first group frame 101 with respect to cam frame 103 is performed through the engagement between second cam grooves 138 and second cam pins 122. Accordingly, as another embodiment, third cam pins 137 and third cam grooves 123 may be absent. Then, the cam grooves required for cam frame 103 are only ones formed in the inner surface thereof, resulting in greater degree of freedom in the design of cam frame 103. For example, it is possible to reduce the thickness of cam frame 103, leading to the reduced outer diameter of lens barrel 100.

On the other hand, in the embodiment, third cam grooves 123 of cam frame 103 engage with third cam pins 137 of first group frame 101. In the state of first group frame 101 being extended forward, when first group frame 101 is subjected to a force from the front, the force can be received through not only the contact between second cam grooves 138 and second cam pins 122, but also the contact between third cam grooves 123 and third cam pins 137. Specifically, wall surfaces 124 and third cam pins 137 come in contact with each other to receive the force. Then, the force applied to both second cam grooves 138 and second cam pins 122 can be reduced. In this way, the configuration is hard to break when first group frame 101 is subjected to an impact caused by, for example, a drop of digital camera 1. Moreover, the force applied to both second cam grooves 138 and second cam pins 122 can be reduced; therefore, it is possible to reduce both the widths of second cam grooves 138 and the widths of the portions of second cam pins 122 where the cam pins engage with second cam grooves 138. This leads to the smaller widths of second cam grooves 138, which allows the increased strength of first group frame 101. In addition, the smaller widths of second cam grooves 138 make it possible to reduce first group frame 101 in size in the optical axis AX direction, while securing the amount of the movement of first group frame 101 in the optical axis AX direction.

The maximum value of the widths of the portions of second cam pins 122 where the second cam pins engage with second cam grooves 138 is different from the maximum value of the widths of the portions of third cam pins 137 where the third cam pins engage with third cam grooves 123. This allows greater degree of freedom in the design. In the embodiment, the maximum value of the widths of the portions of second cam pins 122 where the second cam pins engage with second cam grooves 138 is smaller than the maximum value of the widths of the portions of third cam pins 137 where the third cam pins engage with third cam grooves 123; however, the former may be larger than the latter. In the embodiment, the maximum value of the widths of the portions of second cam pins 122 where the second cam pins engage with second cam grooves 138 is smaller than that of the widths of the portions of third cam pins 137 where the third cam pins engage with third cam grooves 123; therefore, it is possible to increase the strength of first group frame 101 by reducing second cam grooves 138 in width, and also to increase the impact strength thereof against such as a drop by increasing third cam pins 137 in size.

Second cam pins 122 having the smaller widths move along second cam grooves 138, being in contact with second cam grooves 138. The position of first group frame 101 with respect to cam frame 103 is determined from the engagement between second cam pins 122 and second cam grooves 138. Second cam pins 122 and second cam grooves 138 provide a cam mechanism for securing the moving tracks. On the other hand, third cam pins 137 with the larger widths move along wall surfaces 124 of third cam grooves 123, being slightly away from wall surfaces 124. Upon applying an impact to first group frame 101 from the front, third cam pins 137 come in contact with wall surfaces 124. Third cam pins 137 and third cam grooves 123 (wall surfaces 124) provide a cam mechanism for securing drop strength. Of course, third cam pins 137 and wall surfaces 124 may be in contact with each other. However, rather than the above configuration, providing a clearance between third cam pins 137 and wall surfaces 124 is preferable for higher accuracy because the position of first group frame 101 with respect to cam frame 103 is determined only from the shape precision of second cam pins 122 and second cam grooves 138. Moreover, the widths of second cam pins 122 and second cam grooves 138, serving as the cam mechanism for securing the moving tracks, are so small that it is possible to reduce first group frame 101 in size in the optical axis AX direction, while securing the amount of the moving of first group frame 101 in the optical axis AX direction.

Third cam grooves 123 each have the section in which wall surface 124 is formed only in the rear side and no wall surface is disposed in the front side. Specifically, in the section where third cam pins 137 move when changing optical system O from the wide angle end to the telephoto end, no wall surface is formed in the front side of third cam grooves 123. This allows an increase in the widths of third cam pins 137, thereby increasing the strength of third cam pins 137. Therefore, it is possible to increase the impact strength of first group frame 101. Moreover, because no wall is formed in the front side of third cam grooves 123, the shapes of third cam grooves 123 of cam frame 103, more specifically wall surfaces 124, are hard to undercut, resulting in easy molding of cam frame 103 by using a metal mold. Then, when molding cam frame 103 with the metal mold, wall surfaces 124 can be formed at an angle close to the angle orthogonal to optical axis AX, which allows third cam pins 137 to become hard-to-drop-off in the case where third cam pins 137 come in contact with wall surfaces 124 by an impact. This allows improved impact strength thereof.

Note that, as another embodiment, the configuration may be such that the cam grooves for securing the drop strength, which each have the section without a groove in the one side, are disposed in first group frame 101 whereas the cam grooves for securing the moving tracks are disposed in cam frame 103. Moreover, both the cam grooves for securing the drop strength and the cam grooves for securing the moving tracks may be disposed in each of first group frame 101 and cam frame 103, which provides the same advantages.

Second cam pins 122 on the outer face of cam frame 103 are configured with three of second front cam pins 122A and three of second rear cam pins 122B. The three of second front cam pins 122A are arranged at the same position in the optical axis AX direction and at about optical axis AX with an angular pitch of approximately 120°. The three of second rear cam pins 122B are arranged at the position out of second front cam pins 122A in the optical axis AX direction and at about optical axis AX with an angular pitch of approximately 120°. Second cam grooves 138 in the inner face of first group frame 101 are configured with three of second front cam grooves 138A and second rear cam grooves 138B. The three of second front cam grooves 138A are arranged at the same positions in the optical axis AX direction and at about optical axis AX with an angular pitch of approximately 120°. Second rear cam grooves 138B are arranged at the position out of second front cam grooves 138A in the optical axis AX direction, and about optical axis AX with an angular pitch of approximately 120°. Descriptions will be made of a relation among second cam pins 122, second cam grooves 138, and the following positions including ones shifting therebetween. That is, the positions are: the positions of first group frame 101 and cam frame 103 when lens barrel 100 is collapsed (the positions shown in FIG. 10, also referred to as "Collapsed-position," hereinafter); the positions of first group frame 101 and cam frame 103 when the focal length of optical system O is at the wide angle end (the positions shown in FIG. 11, also referred to as "Wide-position," hereinafter); the positions of first group frame 101 and cam frame 103 when the focal length of optical system O is at normal (also referred to as "Normal-position," hereinafter); and the positions of first group frame 101 and cam frame 103 when the focal length of optical system O is at the telephoto end (the positions shown in FIG. 12, also referred to as "Tele-position," hereinafter).

As shown in FIGS. 10 to 12, when cam frame 103 rotates in one direction with respect to first group frame 101, second front cam pins 122A move from the Collapsed-position (FIG. 10) to Wide-position (FIG. 11), Normal-position, and Tele-position (FIG. 12), in this order. In this movement, FIGS. 10 to 12 show moving tracks 137T of third cam pins 137, moving tracks 122AT of second front cam pins 122A, and moving tracks 122BT of second rear cam pins 122B. With this configuration, second front cam pins 122A engage with second front cam grooves 138A, in the section from a position (also referred to as a first position, hereinafter) between Collapsed-position and Wide-position to Tele-position. In the section from Collapsed-position to the first position, second front cam pins 122A are not in contact with second front cam grooves 138A. In the section from Collapsed-position to the first position, second front cam grooves 138A are not formed. On the other hand, second rear cam pins 122B engage with second rear cam grooves 138B in the section from Collapsed-position to the first position. In the section from the first position to Tele-position, second rear cam pins 122B are not in contact with second rear cam grooves 138B. In a part of the section from the first position to Tele-position, second rear cam grooves 138B are not formed.

Each of second cam grooves 138 may be configured such that second cam pin 122 (122A or 122B) alone engages with the cam groove while the pin moves in all the sections from Collapsed-position to Tele-position; however, this configuration requires second cam grooves 138 to be larger in size in the optical axis AX direction. In contrast, as described in the embodiment, in the configuration where the portions of the engagements between second cam pins 122 (122A and 122B) and second cam grooves 138 (138A and 138B) are changed while they move from Collapsed-position to Tele-position, it is possible to increase the amount of the movement of first group frame 101 with respect to cam frame 103, while reducing first group frame 101 in size in the optical axis AX direction. Note, however, that the configuration may be such that second front cam pins 122A and second rear cam pins 122B are disposed in first group frame 101, and that second front cam grooves 138A and second rear cam grooves 138B are disposed in cam frame 103.

Note that, as another embodiment, the same advantages can be obtained even in the case where second front cam pins 122A and second rear cam grooves 138B are disposed in first group frame 101, and second rear cam pins 122B and second front cam grooves 138A are disposed in cam frame 103. In addition, the same advantages can be obtained even in the case where second front cam pins 122A and second rear cam grooves 138B are disposed in cam frame 103, and second rear cam pins 122B and second front cam grooves 138A are disposed in first group frame 101.

<Features of Driving Mechanism of Shutter Unit 106>

Fourth cam pins 139 of the outer face of shutter unit 106 are configured with three of fourth front cam pins 139A and three of fourth rear cam pins 139B. The three of fourth front cam pins 139A are arranged at the same position in the optical axis AX direction and at about optical axis AX with an angular pitch of approximately 120°. The three of fourth rear cam pins 139B are arranged at the position out of fourth front cam pins 139A in the optical axis AX direction and at about optical axis AX with an angular pitch of approximately 120°. Fourth cam grooves 125 in the inner face of cam frame 103 are configured with three of fourth front cam grooves 125A and fourth rear cam grooves 125B. The three of fourth front cam grooves 125A are arranged at the same position in the optical axis AX direction and at about optical axis AX with an angular pitch of approximately 120°. Fourth rear cam grooves 125B are arranged at the position out of fourth front cam grooves 125A in the optical axis AX direction and at about optical axis AX with an angular pitch of approximately 120°.

When cam frame 103 rotates in one direction with respect to shutter unit 106, fourth front cam pins 139A move from Collapsed-position to Wide-position, Normal-position, and Tele-position, in this order. At that time, fourth front cam pins 139A engage with fourth front cam grooves 125A in the section from Collapsed-position, via Wide-position, to Normal-position. In the section from Normal-position to Tele-position, fourth front cam pins 139A are not in contact with fourth front cam grooves 125A. In a part of the section from Normal-position to Tele-position, fourth front cam grooves 125A are not formed. On the other hand, fourth rear cam pins 139B engage with fourth rear cam grooves 125B in the section from Normal-position to Tele-position. In the section from Collapsed-position to Normal-position, fourth rear cam pins 139B are not in contact with fourth rear cam grooves 125B. In a part of the section from Collapsed-position to Normal-position, fourth rear cam grooves 125B are not formed.

With this configuration, it is possible to increase the amount of the movement of shutter unit 106 in the optical axis AX direction with respect to cam frame 103, while reducing cam frame 103 in size in the optical axis AX direction.

<Other Embodiments>

(A) In the first embodiment, although cam frame 103 is configured to be accommodated inside first group frame 101, cam frame 103 may be configured to be accommodated outside first group frame 101.

(B) In the first embodiment, second cam pins 122 and third cam pins 137 have an approximately cylindrical shape. Second cam pins 122 and third cam pins 137 are an example of cam followers. The cam followers may have an elliptic shape or other ones. The cam followers may be ones integrally-molded using a resin, and may be configured with other members including metal ones. Moreover, the cam followers may be configured with shafts and rollers.

(C) In the first embodiment, second cam grooves 138 are not through-grooves and have bottoms. Of course, second cam grooves 138 may be through-grooves; however, the grooves with bottoms are preferable because of their higher strength for holding the lenses.

(D) When fourth cam grooves 125 are configured not in the inner side of third cam grooves 123, the thickness of cam frame 103 can be preferably reduced further.

<Features of First Embodiment>

Like the first group lens barrel disclosed in Patent Literature 1, the tube for holding the lenses is required to have strength enough to hold the lenses. Therefore, the tube for holding the lenses must have a certain thickness. In the tube for holding the lenses, if part of its thickness is utilized for the driving mechanism or the like while keeping a certain amount of the thickness, it will allow greater degree of freedom in designing the driving mechanism while keeping a downsizing of the tube in the diametrical direction. However, such a configuration has not yet been proposed.

Hence, an object of the technologies disclosed herein is to provide the lens barrel capable of increasing the degree of freedom in designing the driving mechanism while keeping the downsizing of the tube in the diametrical direction.

Hereinafter, characteristic parts of the first embodiment will be listed and described. Note, however, that the aspects, included in the first embodiment, of the present invention are not limited to those described below. Note also that the description in a parenthesis placed after the description of each configuration is only a specific example of the configuration, which is made for a better understanding of the characteristics. Each of the configurations is not limited to the specific example. Moreover, in order to achieve the advantages described herein for each of the characteristics, configurations other than the characteristic ones described herein may be modified or omitted.

[F1]

A lens barrel includes:

an optical system (O) for forming an optical image of an object;

a first tube (first group frame 101) for supporting at least one lens (first lens group G1) that is included in the optical system; and a second tube (cam frame 103) disposed inside or outside the first tube.

The first tube has first cam grooves (second cam grooves 138) in a side surface thereof on which the second tube is disposed. The second tube has first cam followers (second cam pins 122) engaging with the first cam grooves.

(Advantage) It is possible to provide the lens barrel capable of increasing the degree of freedom in designing its driving mechanism while keeping a downsizing of the barrel in the diametrical direction.

[F2]

The lens barrel described in F1 is configured such that the second tube has second cam grooves (third cam grooves 123) in a side surface on which the first tube is disposed, and that the first tube has second cam followers (third cam pins 137) engaging with the second cam grooves.

(Advantage) It is possible to dispose the cam followers in both the first tube and the second tube, which allows the increased number of the cam followers, resulting in improved drop strength.

[F3]

The lens barrel described in F2 is configured such that at least one of the first cam grooves and the second cam grooves (third cam grooves 123) have a section (123B) in which wall surfaces (124) are disposed in one side in the optical axis direction and no wall surface is disposed in the other side.

(Advantage) The cam followers engage with the cam grooves having the section in which the wall surfaces are disposed in the one side in the optical axis direction and no wall surface is disposed in the other side, which allows the widths of the cam followers to be made larger in size. This results in the increased strength of the cam followers. Consequently, it is possible to increase the impact strength of the lens barrel. Moreover, because of the absence of a wall surface in the other side, the shapes of the wall surfaces in the one side are hard to undercut, resulting in easy molding of the tube by using a metal mold. With this configuration, the wall surfaces can be formed at an angle close to the angle orthogonal to the optical axis, which allows the cam followers to become hard-to-drop-off in case of the cam followers coming in contact with the wall surfaces by an impact. This allows the improved impact strength of the lens barrel.

[F4]

The lens barrel described in F2 is configured such that the maximum value of the width of the portions of the first cam followers (second cam pins 122) where the first cam followers engage with the first cam grooves (second cam grooves 138), is different from the maximum value of the width of the portions of the second cam followers (third cam pins 137) where the second cam followers engage with the second cam grooves (third cam grooves 123).

(Advantage) It is possible to secure the degree of freedom of the design. For example, as a matter of design convenience, downsizing is allowed of the cam followers in one side, with the drop strength being secured by upsizing the cam followers in the other side.

[F5]

A cam mechanism includes:

a first tube (first group frame 101) having, in one of the outer side surface thereof and the inner side surface thereof,
    first cam grooves (second cam grooves 138), and
    first cam followers (third cam pins 137); and
a second tube (cam frame 103) disposed on the one of the side surfaces of the first tube, the second tube having
    second cam grooves (third cam grooves 123) that engage with the first cam followers (third cam pins 137), and
    second cam followers (second cam pins 122) that engage with the first cam grooves.

(Advantage) The second tube rotates with respect to the first tube, thereby moving with respect to the first tube in the direction of the axis of the rotation. Then, the cam followers can be disposed in both the first tube and the second tube, which allows the increased number of the cam followers, resulting in the improved drop strength.

[F6]

The cam mechanism described in F5 is configured such that the maximum value of the widths of the portions of the second cam followers (second cam pins 122) where the second cam followers engage with the first cam grooves (second cam grooves 138), is larger than the maximum value of the widths of the portions of the first cam followers (third cam pins 137) where the first cam followers engage with the second cam grooves (third cam grooves 123).

(Advantage) It is possible to secure the degree of freedom of the design. For example, as a matter of design convenience, downsizing is allowed of the cam followers in one side, with the drop strength being secured by upsizing the cam followers in the other side.

[F7]

The cam mechanism described in F6 is configured such that, when the second tube (cam frame 103) rotates with respect to the first tube (first group frame 101) to move with respect to the first tube in the direction of the axis of the rotation, a part of the region in which the first cam followers (third cam pins 137) move is located outside the end portion of the second tube in the direction of the axis of the rotation.

(Advantage) It is possible to reduce the length of the second tube. Particularly, because the second cam grooves in which the first cam follower pass through lie off in the longitudinal direction in the first tube, it is possible to prevent the second tube having the grooves with larger widths from becoming larger in size in the longitudinal direction. It is possible to comprehensively reduce the total length of the cam mechanism in the state of being collapsed.

[F8]

The cam mechanism described in F7 is configured such that the first cam followers (third cam pins 137), when located at the part of the region (FIG. 11 or 12), come in contact with the second tube, upon being subjected to a force in the direction in which the first tube and the second tube are collapsed.

(Advantage) It is possible to secure the drop strength in the direction of tube-collapsing.

(Second Exemplary Embodiment)

Figure 13:
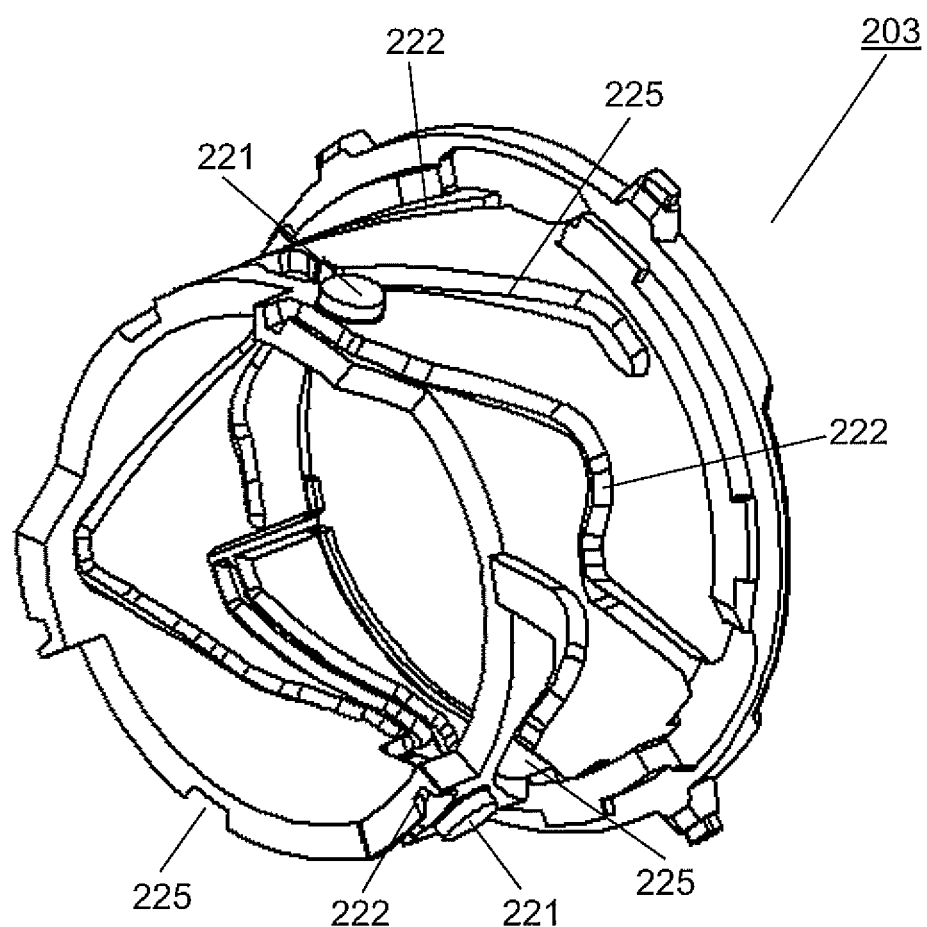
FIG. 13 is a perspective view of a cam frame according to a second embodiment.
Figure 14:
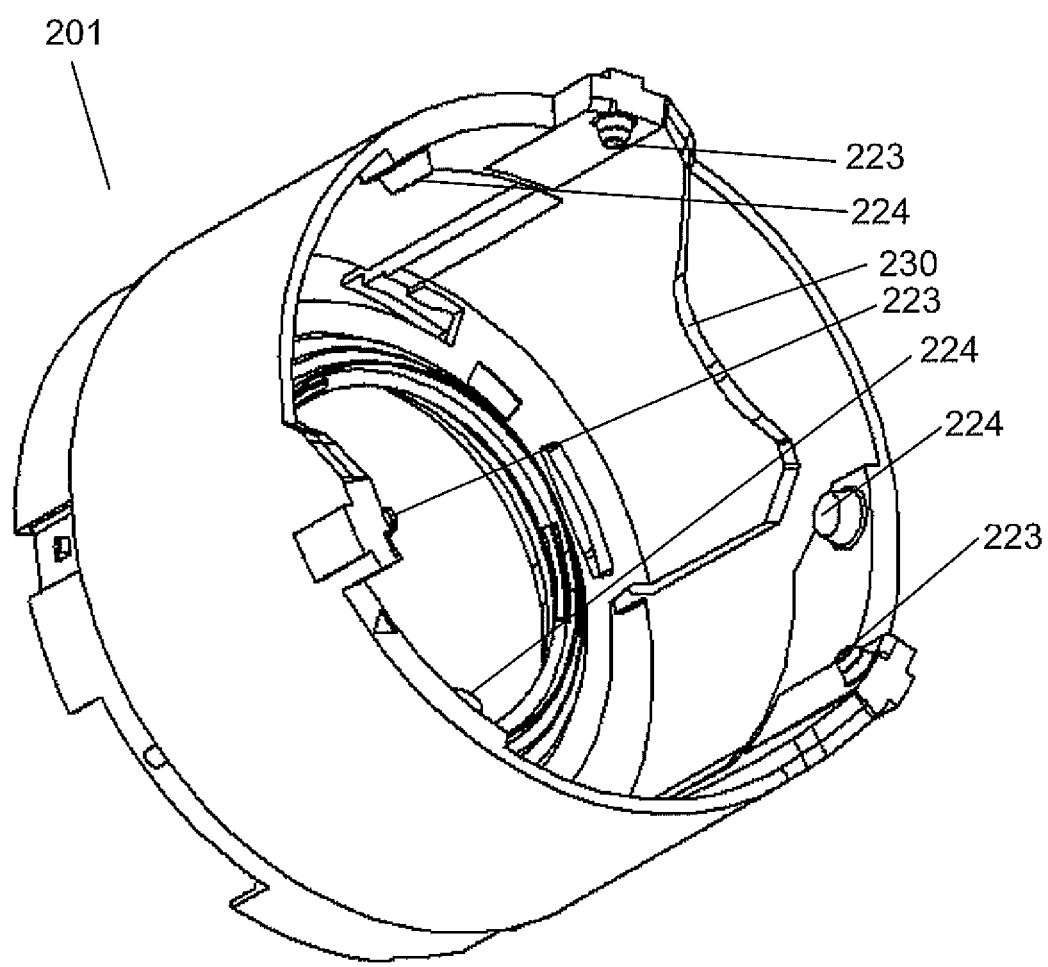
FIG. 14 is a perspective view of a first group frame according to the second embodiment.

Next, lens barrel 200 (not shown) according to a second embodiment will be described. Here, descriptions are made of a relation between first group frame 201 and cam frame 203 shown in FIGS. 13 and 14; however, descriptions of the other configurations of lens barrel 200 are omitted. Note that cam frame 203 is different from cam frame 103 in the first embodiment in that cam frame 203 is driven not directly by a zoom motor. Therefore, cam frame 203 includes no gear part. However, the gear part should not be construed as limitations on the technologies disclosed herein.

Figure 15:
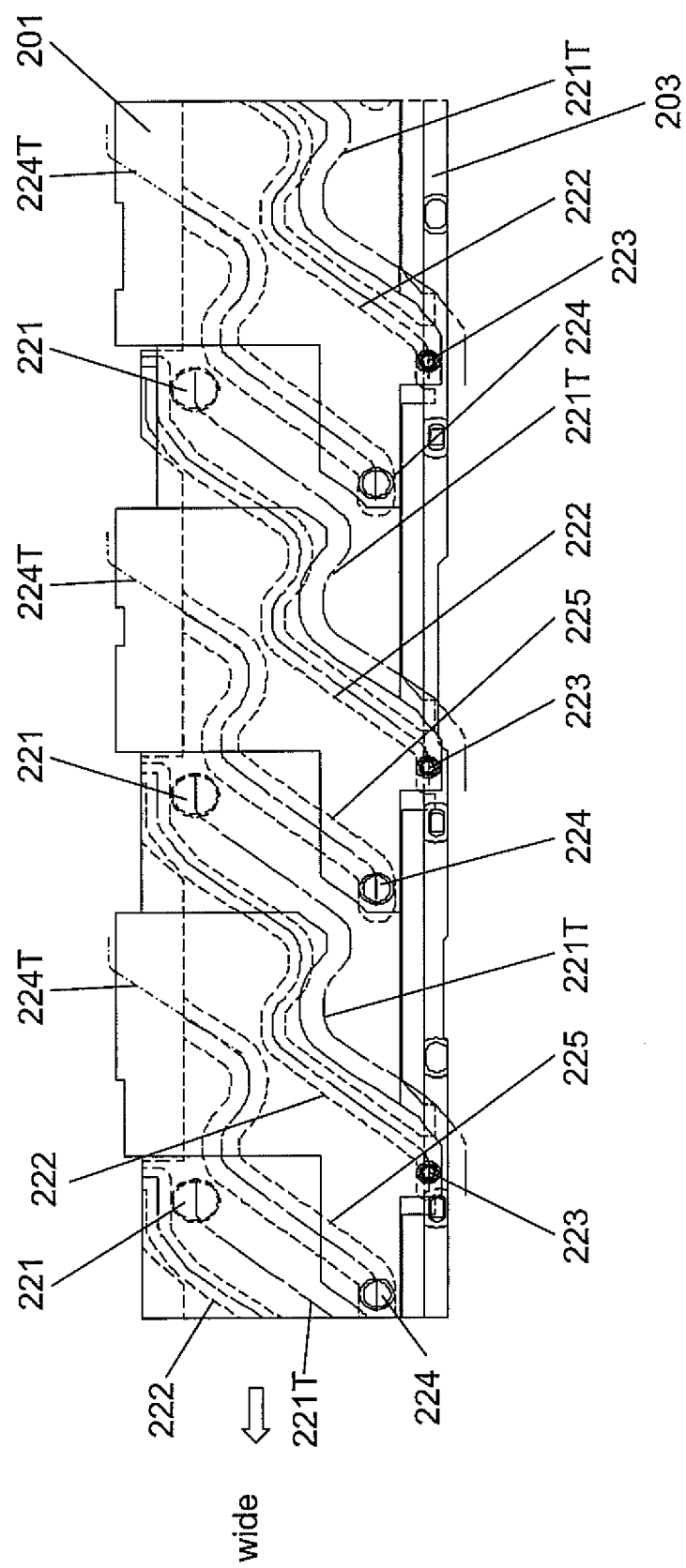
FIG. 15 is a developed view of the first group frame and the cam frame, when being collapsed, according to the second embodiment.
Figure 16:
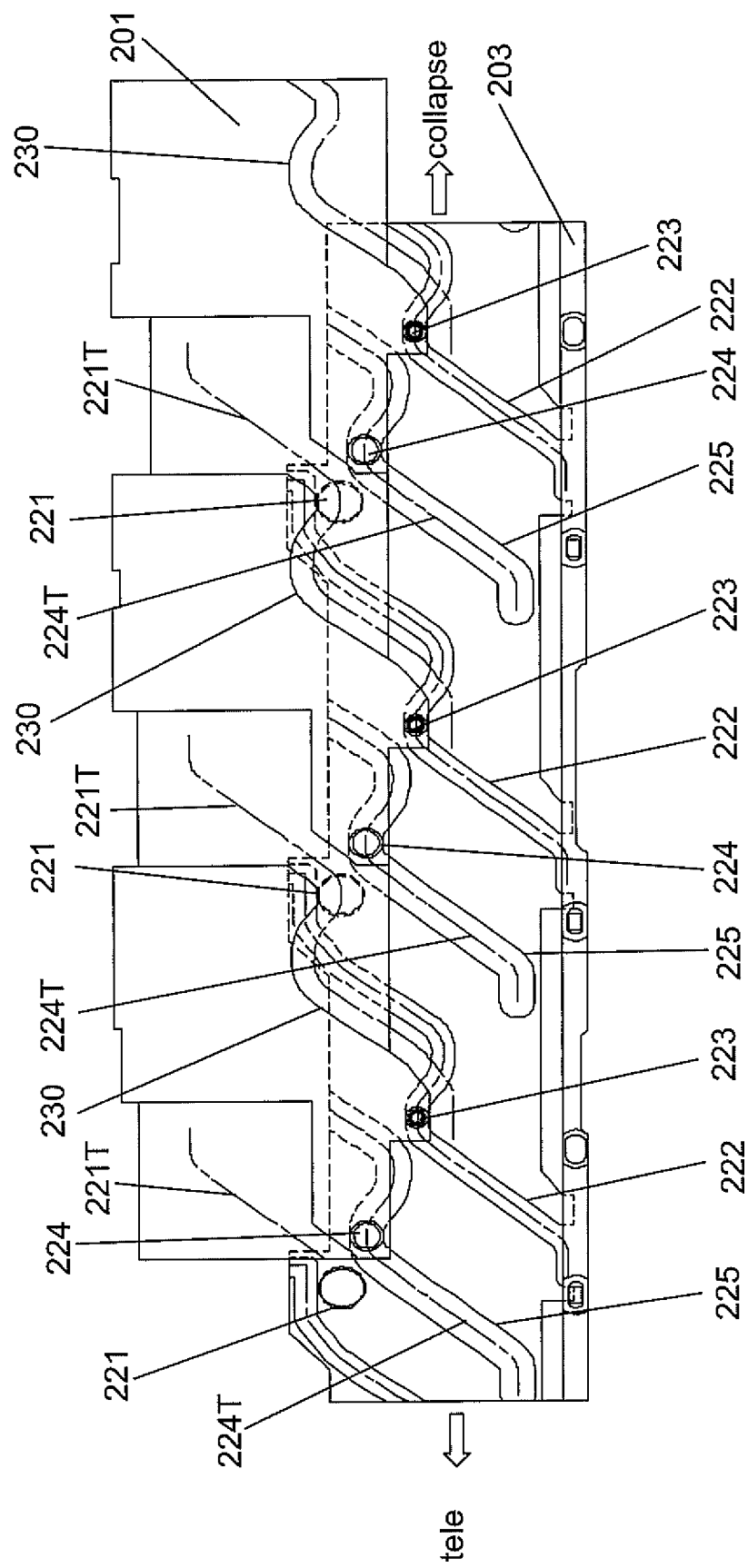
FIG. 16 is a developed view of the first group frame and the cam frame, at the wide angle end, according to the second embodiment.
Figure 17:
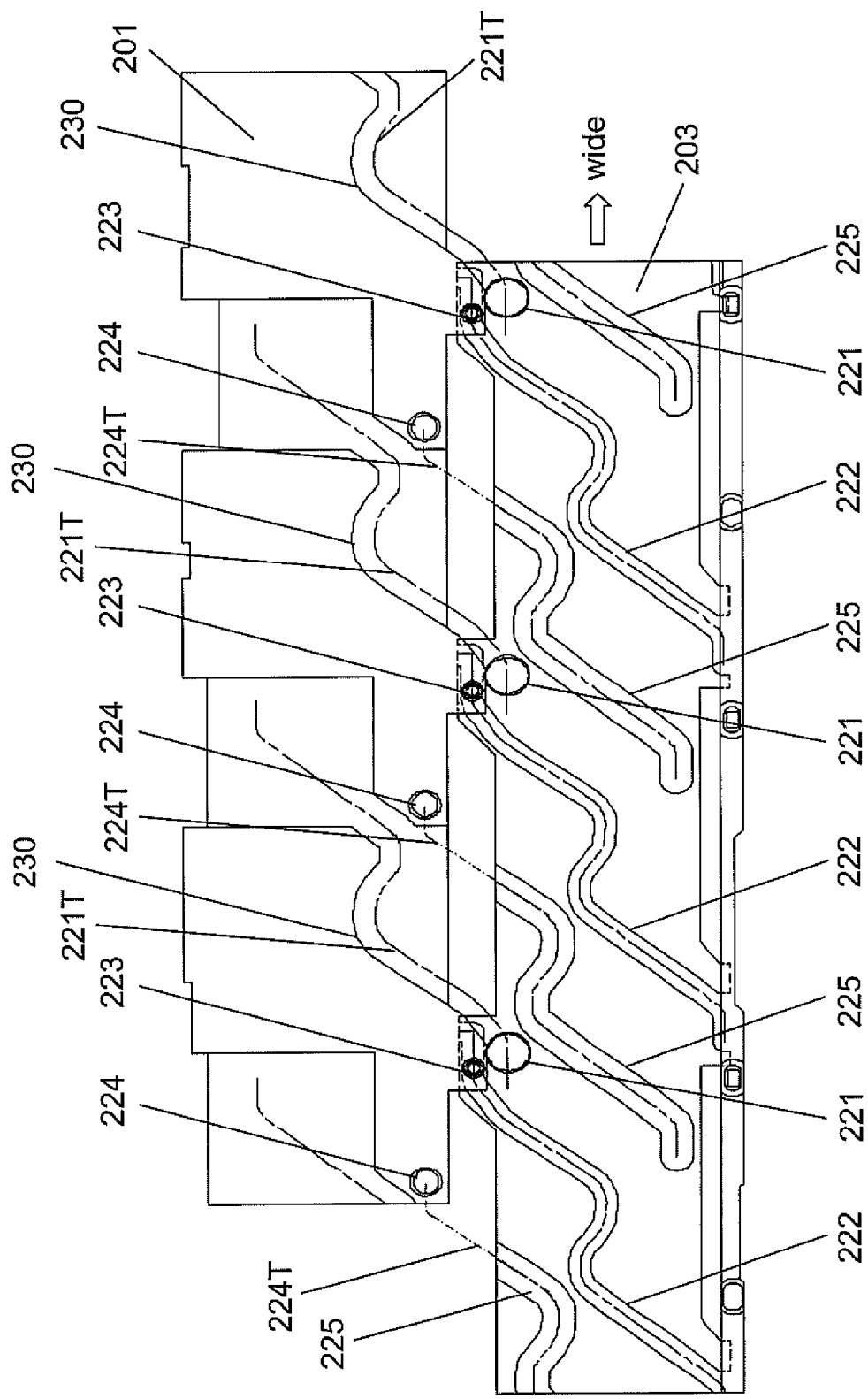
FIG. 17 is a developed view of the first group frame and the cam frame, at the telephoto end, according to the second embodiment.

FIGS. 15 to 17 show developed views which illustrate a relation of developed positions between first group frame 201 and cam frame 203. In each of the figures, faces in the inner peripheral side of first group frame 201 are indicated by solid lines, and faces in the outer peripheral side of cam frame 203 are indicated by solid lines. Moreover, of cam frame 203, parts which overlap with first group frame 201 are indicated by dashed lines. FIG. 15 shows the positional relation when lens barrel 200 is in the state of being collapsed. FIG. 16 shows the positional relation when optical system O is at the wide angle end. FIG. 17 shows the positional relation when optical system O is at the telephoto end. Cam frame 203 rotates in one direction to change the positional relation, from the state of FIG. 15, via the state of FIG. 16, to the state of FIG. 17. In this operation, cam frame 203 moves to the left of first group frame 201, in the developed views.

Second cam pins 223 move along second cam grooves 222, from the positions shown in FIG. 15 to the positions shown in FIG. 17. For this operation, FIGS. 15 to 17 illustrate moving tracks 221T of first auxiliary pins 221 and moving tracks 224T of second auxiliary pins 224.

As shown in FIG. 16, walls 230 are each formed along a partial range of moving track 221T. Specifically, the walls are formed along the moving tracks of first auxiliary pins 221 when the pins move from the state shown in FIG. 17 to the state shown in FIG. 16, and are formed along the first part of the moving tracks of the pins when the pins move from the state shown in FIG. 16 to the state shown in FIG. 15. That is, walls 230 are formed along the moving tracks of first auxiliary pins 221 in the whole section in which the first auxiliary pins move when the focal length of optical system O is changed. Accordingly, when an external force is applied to lens barrel 200 due to, for example, an accidental drop of the camera by a user during photographing, walls 230 and first auxiliary pins 221 come in contact with each other and are subjected to the external force. This can reduce the force applied to second cam pins 223.

Walls 230 are each formed along the partial range of moving track 221T, and formed only in one side in the optical axis AX direction. Therefore, the shape of a metal mold for forming first group frame 201 is simple compared with that in the case where walls 230 are formed in both sides in the optical axis AX direction, leading to easier manufacturing of first group frame 201. Note that, as another embodiment, first group frame 201 may be disposed inside cam frame 203, and walls 230 are formed at the outer periphery of first group frame 201. In contrast, in the embodiment, since walls 230 are disposed inside first group frame 201, the advantages described above are more remarkable. That is, the shape of the metal mold is prone to be complex in the case where walls 230 are formed in both sides in the optical axis AX direction; however, the shape of the metal mold according to the embodiment is simple. Moreover, first auxiliary pins 221 can be made larger in size, resulting in higher strength of first auxiliary pins 221. This allows lens barrel 200 to be harder to break.

Walls 230 come in contact with first auxiliary pins 221, when an external force is applied in the direction in which first group frame 201 collapses onto cam frame 203. An impact caused by a drop of the camera occurs, at a high frequency, in the direction in which first group frame 201 collapses onto cam frame 203. For this reason, lens barrel 200 is harder to break. Note that, as another embodiment, the configuration may be such that walls 230 come in contact with first auxiliary pins 221 when an external force is applied in the direction in which first group frame 201 extends from cam frame 203. When the camera drops and an impact is applied to the camera body to cause first group frame 201 to be extended from cam frame 203 due to an inertial force, the impact applied to second cam pins 223 is moderated.

Walls 230, in a partial range, are each opened in a direction, specifically in the direction toward the image-forming side in the optical axis AX direction. For this reason, in forming walls 230, the metal mold arranged inside first group frame 201 can be pulled out, after the molding, toward the direction to the open-wall side, which allows the simple shape of the metal mold.

The circumference-directional ranges in which the walls 230 are opened do not overlap with the circumference-directional positions at which second cam pins 223 are formed. Therefore, the metal mold for forming first group frame 201 has the simpler shape.

As shown in FIG. 16, first auxiliary grooves 225 are each formed along a partial range of moving tracks 224T. Specifically, the first auxiliary grooves are formed along the moving tracks of second auxiliary pins 224 when the pins move from the state shown in FIG. 15 to the state shown in FIG. 16, and are formed along the moving tracks of the pins when the pins move from the state shown in FIG. 16 until a middle point in the course to the state shown in FIG. 17. Accordingly, in the state shown in FIG. 16, for example, when an external force is applied to lens barrel 200 due to, for example, an accidental drop of the camera by the user during photographing, first auxiliary grooves 225 and second auxiliary pins 224 come in contact with each other and are subjected to the external force. This can reduce the force applied to second cam pins 223. In this way, in the state of lens barrel 200 being shifting from the being-collapsed state to the ready-to-photograph state, or in at least a part of the state of the lens barrel undergoing zooming in the ready-to-photograph state, when an external force is applied, second auxiliary pins 224 and first auxiliary grooves 225 are contactable with each other, and also first auxiliary pins 221 and walls 230 are contactable with each other. Consequently, the strength against external forces is further increased. Hereinafter, this state is referred to as the dual impact-protection state. In the embodiment, when optical system O is at the wide angle end, lens barrel 200 is in the dual impact-protection state. Since photographing at the wide angle end of optical system O is performed at a high frequency, lens barrel 200 is harder to break. Moreover, in the embodiment, while shifting optical system O from the wide angle end to the telephoto end, there exists the state where the amount of the extension of first group frame 201 with respect to cam frame 203 takes a minimum value. This state occurs, in FIG. 15, when each of second cam pins 223 is located at the point where each of cam grooves 222 takes the minimum value in its downward convex curve in the figure. In this state, lens barrel 200 is in the dual impact-protection state. In the state where the amount of the extension of first group frame 201 is not at the minimum value, when first group frame 201 is subjected to an external force in the optical axis AX direction, part of the external force is distributed to rotate cam frame 203, which can reduce the force applied to second cam pins 223. However, in the state where the amount of the extension of first group frame 201 is at the minimum value, when first group frame 201 is subjected to an external force in the optical axis AX direction, the external force is hard to be distributed to rotate cam frame 203, which causes the strong force applied to second cam pins 223. For this reason, lens barrel 200 in this state is configured to be in the dual impact-protection state, which allows lens barrel 200 to be harder to break.

Moreover, in addition to the dual impact-protection state, upon being subjected to an external force, lens barrel 200 takes one of the following states: That is, the state where second auxiliary pins 224 and first auxiliary grooves 225 come in contact with each other, and the state where first auxiliary pins 221 and walls 230 come in contact with each other. In the embodiment, as shown in FIG. 17, upon being subjected to an external force when optical system O is at the wide angle end, second auxiliary pins 224 and first auxiliary grooves 225 do not come in contact with each other, whereas first auxiliary pins 221 and walls 230 come in contact with each other. Moreover, as shown in FIG. 15, upon being subjected to an external force when lens barrel 200 is in the state of being collapsed, second auxiliary pins 224 and first auxiliary grooves 225 come in contact with each other, whereas first auxiliary pins 221 and walls 230 do not come in contact with each other. Therefore, even in the state of lens barrel 200 being not in the dual impact-protection state, lens barrel 200 is hard to break against external forces. Moreover, because walls 230 and first auxiliary grooves 225 share the role of protecting lens barrel 200 from impacts depending on the state of the barrel, it is possible to downsize the shapes of walls 230 and first auxiliary grooves 225, which allows greater degree of freedom in the design of lens barrel 200. For example, the metal mold for forming first group frame 201 can be easily configured. In addition, for example, the part of cam frame 203 where first auxiliary grooves 225 are formed can be downsized in the optical axis AX direction, which allows downsizing of lens barrel 200 in the state of being collapsed.

<Other Embodiments>

(A) In the second embodiment, although cam frame 203 is configured to be accommodated inside first group frame 201, cam frame 203 may be configured to be accommodated outside first group frame 201.

(B) In the second embodiment, second cam pins 223 are approximately cylindrical. Second cam pins 223 are an example of cam followers. The cam followers may have an elliptic shape or other ones. The cam followers may be ones integrally-molded using a resin, and may be configured with other members including metal ones. Moreover, the cam followers may be configured with shafts and rollers.

(C) First auxiliary pins 221 and second auxiliary pins 224 are an example of projections. First auxiliary pins 221 and second auxiliary pins 224 may have an elliptic shape or other ones. First auxiliary pins 221 and second auxiliary pins 224 may be ones integrally-molded using a resin, and may be configured with other members including metal ones. Moreover, first auxiliary pins 221 and second auxiliary pins 224 may be configured with shafts and rollers.

(D) In order to obtain the dual impact-protection state, the configuration may be as follows: For example, walls 230 may be formed in both sides in the optical axis AX direction. Moreover, walls 230 may be formed along the whole or a part of the section of moving tracks 221T of first auxiliary pins 221 when lens barrel 200 shifts from the being-collapsed state to the ready-to-photograph state, and when the lens barrel undergoes zooming in the ready-to-photograph state. Like this, second cam grooves 222 as well may be formed along the whole or a part of the section of moving tracks 224T of second auxiliary pins 224 when lens barrel 200 shifts from the being-collapsed state to the ready-to-photograph state, and when the lens barrel undergoes zooming in the ready-to-photograph state.

(E) The configuration may be such that second cam pins 223 are disposed on cam frame 203 and that second cam grooves 222 are disposed in first group frame 201. However, as described in the above embodiment, it is preferable that walls 230 and second cam pins 223 be disposed on first group frame 201, that is, second cam grooves 222 be not disposed in first group frame 201, leading to the simple shape of the metal mold for forming first group frame 201.

(F) It should be noted that the second embodiment described above is essentially a preferable example which is not intended in any sense to limit the present invention, its application, or the range of its application. Moreover, the embodiment described above can be used through appropriate modification, omission, or combination of the aspects of the embodiment.

<Features of Second Embodiment>

Hereinafter, characteristic parts of the second embodiment will be listed and described. Note, however, that the aspects, included in the second embodiment, of the present invention are not limited to those described below. Note also that the description in a parenthesis placed after the description of each configuration is only a specific example of the configuration, which is made for a better understanding of the characteristics. Each of the configurations is not limited to the specific example. Moreover, in order to achieve the advantages described herein for each of the characteristics, configurations other than the characteristic ones described herein may be modified or omitted.

[F1]

Lens barrel 200 includes:

an optical system (O) for forming an optical image of an object;

a first tube (first group frame 201) for supporting at least one lens (G1) included in the optical system (O); and a second tube (cam frame 203) disposed inside or outside the first tube.

One (cam frame 203) of the first tube and the second tube has cam grooves (second cam grooves 222). The other (first group frame 201) of the first tube and the second tube has cam followers (second cam pins 223) which engage with the cam grooves. The first tube has first projections (second auxiliary pins 224) which protrude toward the second tube. The second tube has second projections (first auxiliary pins 221) which protrude toward the first tube. The first tube has first walls (walls 230) formed along the moving tracks of the second projections (first auxiliary pins 221) that move when the cam followers move along the cam grooves. The second tube has second walls (first auxiliary grooves 225) formed along the moving tracks of the first projections (second auxiliary pins 224) that move when the cam followers move along the cam grooves.

With this configuration, upon application of an external force, the force acting on the cam followers can be moderated. In addition, this allows the greater degree of freedom of the design of such a lens barrel.

INDUSTRIAL APPLICABILITY

The technologies disclosed herein are applicable to lens barrels for use in devices including, for example, digital cameras, camcorders, film cameras, cellular phones, and appliances with an optical system for projection such as projectors.

REFERENCE MARKS IN THE DRAWINGS 1 digital camera
100 lens barrel
O optical system
AX optical axis
101 first group frame
102 first group rectilinear-advance frame
103 cam frame
104 second group rectilinear-advance frame
105 image stabilizing frame
106 shutter unit
107 fixing frame
108 third group frame
110 CCD
G1 first lens group
112 first cam groove
113 first rectilinear-advance guide groove
114 first drive gear
115 mounting part
116 zoom motor unit
117 tube part
118 first flange part
119 first cam pin
120 gear part
121 first bayonet engaging part
122AT moving track
122BT moving track
122A second front cam pin
122B second rear cam pin
122 second cam pin
123 third cam groove
124 wall surface
125A fourth front cam groove
125B fourth rear cam groove
125 fourth cam groove
126 second bayonet engaging part
127 first rectilinear-advance guide projection
128 second rectilinear-advance guide groove
129 third bayonet engaging part
130 second flange part
131 arm part
132 second rectilinear-advance guide projection
133 fourth bayonet engaging part 134 barrier unit
135 barrier part
136 third rectilinear-advance guide projection
137T moving track
137 third cam pin
138A second front cam groove
138B second rear cam groove
138 second cam groove
139A fourth front cam pin
139B fourth rear cam pin
139 fourth cam pin
140 third rectilinear-advance guide groove
141 rectilinear-advance guide part
142 anti-rotation part
143 nut engagement part
144 first guide pole
145 second guide pole
146 CCD mounting plate
147 opening
148 focus motor unit
149 nut
200 lens barrel
201 first group frame
203 cam frame
221 first auxiliary pin
221T moving track
222 second cam groove
223 second cam pin
224 second auxiliary pin
224T moving track
225 first auxiliary groove
230 wall

The invention claimed is:

1. A lens barrel including a plurality of cam grooves and a plurality of cam followers, the lens barrel comprising:
an optical system for forming an optical image of an object;
a first tube for supporting at least one lens included in the optical system; and
a second tube disposed one of inside and outside the first tube,
wherein
the first tube includes a second cam groove and a third cam follower in a side surface thereof on which the second tube is disposed,
the second tube includes a second cam follower engaging with the second cam groove and includes a third cam groove engaging with the third cam follower, and
at least one of the second cam groove and the third cam groove includes a nonlinear section having a nonlinear shape, in the nonlinear section, at least one of the pairs among the pair of the second cam follower and the second cam groove, and the pair of the third cam follower and the third cam groove is engaged in a state in which, while the other one of such pairs is engaged at the same time.

2. The lens barrel according to claim 1, wherein at least one of the second cam groove and the third cam groove includes a section, in which a wall surface is disposed in one side of an optical axis direction and no wall surface is disposed in the other side.

3. The lens barrel according to claim 1, wherein a maximum value of a width of a portion of the second cam follower where the second cam follower engages with the second cam groove is different from a maximum value of a width of a portion of the third cam follower where the third cam follower engages with the third cam groove.

4. A cam mechanism including a plurality of cam grooves and a plurality of cam followers, the cam mechanism comprising:
a first tube including, in one of an outer side surface thereof and an inner side surface thereof,
a second cam groove, and
a third cam follower; and
a second tube disposed on the one of the side surfaces of the first tube, the second tube including
a third cam groove engaging with the third cam follower, and
a second cam follower engaging with the second first cam groove,
wherein at least one of the second cam groove and the third cam groove includes a nonlinear section having a nonlinear shape, in the nonlinear section, at least one of the pairs among the pair of the second cam follower and the second cam groove, and the pair of the third cam follower and the third cam groove is engaged in a state in which, while the other one of such pairs is engaged at the same time.

5. The cam mechanism according to claim 4, wherein a maximum value of a width of a portion of the second cam follower where the second cam follower engages with the second cam groove is smaller than a maximum value of a width of a portion of the third cam follower where the third cam follower engages with the third cam groove.

6. The cam mechanism according to claim 5, wherein, when the second tube rotates with respect to the first tube to move with respect to the first tube in a direction of an axis of rotation, a part of a region in which the second cam follower moves is located outside an end portion of the first tube in the direction of the axis of the rotation.

7. The cam mechanism according to claim 6, wherein, when the second cam follower is located at the part of the region, the second cam follower comes in contact with the first tube, upon being subjected to a force in a direction in which the first tube and the second tube are collapsed.

8. A lens barrel comprising:
an optical system for forming an optical image of an object;
a first tube for supporting at least one lens included in the optical system; and
a second tube disposed one of inside and outside the first tube,
wherein
one of the first tube and the second tube includes a cam groove;
the other of the first tube and the second tube includes a cam follower engaging with the cam groove;
the first tube includes a first projection protruding toward the second tube;
the second tube includes a second projection protruding toward the first tube;
the first tube includes a first wall formed along a moving track of the second projection that moves when the cam follower moves along the cam groove; and
the second tube includes a second wall formed along a moving track of the first projection that moves when the cam follower moves along the cam groove.

9. A lens barrel including a plurality of cam grooves and a plurality of cam followers, the lens barrel comprising:
a first tube; and
a second tube disposed one of inside and outside the first tube;

wherein:

the first tube includes a second cam groove and a third cam follower in a side surface thereof on which the second tube is disposed, the second tube includes a second cam follower engaging with the second cam groove and includes a third cam groove engaging with the third cam follower, and at least one of the second cam groove and the third cam groove includes a section, in which a wall surface is disposed in one side of an optical axis direction and no wall surface is disposed in the other side.

* * * * *